United States Patent
Kim et al.

(10) Patent No.: US 12,556,095 B2
(45) Date of Patent: Feb. 17, 2026

(54) POWER SUPPLY INCLUDING COMMON SHARING PATH AND DRIVING METHOD THEREOF

(71) Applicant: Samsung Electronics Co., Ltd., Suwon-si (KR)

(72) Inventors: Minwoo Kim, Suwon-si (KR); Hyungju Park, Suwon-si (KR); Woosuk Choi, Suwon-si (KR); Wookwan Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 189 days.

(21) Appl. No.: 18/479,741

(22) Filed: Oct. 2, 2023

(65) Prior Publication Data
US 2024/0364220 A1    Oct. 31, 2024

(30) Foreign Application Priority Data
Apr. 25, 2023   (KR) .................. 10-2023-0054113

(51) Int. Cl.
*H02M 3/158* (2006.01)
*H02M 1/088* (2006.01)
(Continued)

(52) U.S. Cl.
CPC ......... *H02M 3/1582* (2013.01); *H02M 1/088* (2013.01); *H02M 1/14* (2013.01); *H02M 1/32* (2013.01)

(58) Field of Classification Search
CPC ...... H02M 3/1582; H02M 3/158; H02M 1/08; H02M 1/088; H02M 1/14; H02M 1/32;
(Continued)

(56) References Cited

U.S. PATENT DOCUMENTS 8,022,746 B1 * 9/2011 Signoretti .......... H03K 17/6871
                                                           327/423
8,519,691 B2    8/2013 McCloy-Stevens
(Continued)

FOREIGN PATENT DOCUMENTS

CN    110994995 A *  4/2020 .......... H02M 3/1584
CN    113572352 A    10/2021

*Primary Examiner* — Jue Zhang
*Assistant Examiner* — Jye-June Lee
(74) *Attorney, Agent, or Firm* — Harness, Dickey & Pierce, P.L.C.

(57) ABSTRACT

A power supply includes a first and second switching node, a first power switch and a second power switch, and a first bootstrap capacitor, the first bootstrap capacitor including one end connected to the first switching node, a third and a fourth power switch, and a second bootstrap capacitor, the second bootstrap capacitor including one end connected to the second switching node, and a charge sharing circuit storing a charge using a power supply voltage, providing a first charge sharing path for the first bootstrap capacitor from the stored charge based on a first voltage charged in the first bootstrap capacitor, and to provide a second charge sharing path for the second bootstrap capacitor from the stored charge based on a second voltage charged in the second bootstrap capacitor. The first charge sharing path and the second charge sharing path include a common charge sharing path and overlap each other.

20 Claims, 17 Drawing Sheets

(51) Int. Cl.
*H02M 1/14* (2006.01)
*H02M 1/32* (2007.01)

(58) Field of Classification Search
CPC .. H02M 1/0006; H03K 19/01714; H03K 4/50
See application file for complete search history.

(56) References Cited

U.S. PATENT DOCUMENTS

| | | |
|---|---|---|
| 10,205,388 B2 | 2/2019 | Choi et al. |
| 11,139,735 B2 | 10/2021 | Deng |
| 2018/0109179 A1* | 4/2018 | Zhao ................... H02M 3/1582 |
| 2020/0099299 A1* | 3/2020 | Thiele ................. H02M 3/1582 |
| 2021/0242768 A1 | 8/2021 | Ishikura |
| 2022/0085718 A1* | 3/2022 | Singh .................. H02M 3/1582 |
| 2022/0123653 A1* | 4/2022 | Youn ................... H02M 3/1582 |
| 2023/0238888 A1* | 7/2023 | Youn ................... H02M 3/1582 323/282 |
| 2023/0246550 A1* | 8/2023 | Guerra ................ H02M 3/1582 323/283 |
| 2024/0396442 A1* | 11/2024 | Cattani .................. H02M 1/08 |
| 2025/0125712 A1* | 4/2025 | Yang ................... H02M 3/1582 |

* cited by examiner

POWER SUPPLY INCLUDING COMMON SHARING PATH AND DRIVING METHOD THEREOF

CROSS-REFERENCE TO RELATED APPLICATION

This application claims priority to and the benefit of Korean Patent Application No. 10-2023-0054113 filed in the Korean Intellectual Property Office on Apr. 25, 2023, the entire contents of which are incorporated herein by reference.

BACKGROUND

Various example embodiments relate to a power supply and/or a driving method thereof.

A power supply may convert an input power source to supply electric power to an electronic device. The power supply may operate according to a voltage of the input power source (hereinafter referred to as an input voltage), and according to a target voltage of the electric power supplied to the electronic device. For example, the power supply may operate in one or more of a buck mode, a boost mode, or a buck-boost mode so as to control a voltage (hereinafter referred to as an output voltage) of the electric power supplied to the electronic device to the target voltage.

The power supply may include a plurality of switching elements, and may control switching operations of the plurality of switching elements according to each mode. When the switching element is or corresponds to an NMOS transistor, the power supply may include a bootstrap capacitor to provide a gate on-voltage to a gate of the NMOS transistor. In order to secure or help secure a time for charging the bootstrap capacitor, there is a restriction on the switching operation, and due to this restriction, there is a problem in which a large ripple occurs in the output voltage when the mode is changed.

SUMMARY

Some example embodiments provide a power supply and/or a driving method of the power supply capable of reducing a ripple of an output voltage generated when a mode is changed.

A power supply according to some example embodiments may include an inductor connected between a first switching node and a second switching node, a first power switch, a second power switch, and a first bootstrap capacitor, the first bootstrap capacitor including one end connected to the first switching node, a third power switch, a fourth power switch, and a second bootstrap capacitor, the second bootstrap capacitor including one end connected to the second switching node, and a charge sharing circuit configured to store a charge using a power supply voltage, to provide a first charge sharing path for the first bootstrap capacitor from the stored charge based on a first voltage charged in the first bootstrap capacitor, and to provide a second charge sharing path for the second bootstrap capacitor from the stored charge based on a second voltage charged in the second bootstrap capacitor. The first charge sharing path and the second charge sharing path include a common charge sharing path and overlap each other.

Alternatively or additionally a power supply according to some example embodiments may include a first power switch including one end configured to have an input voltage is configured be provided, an inductor including one end connected to another end of the first power switch at a first switching node, a second power switch including one end connected to another end of the inductor at a second switching node, a first capacitor connected between the first switching node and a first node, a second capacitor connected between the second switching node and a second node, and a first sharing transistor and a second sharing transistor connected in series between the first node and the second node.

Alternatively or additionally a driving method of a power supply according to some example embodiments relates to the power supply including a first power switch connected between an input terminal and a first switching node and a second power switch connected between an output terminal and a second switching node. The driving method may include, in a buck mode of the power supply, sharing a charge from a first capacitor connected to the first switching node to a first bootstrap capacitor connected to the second switching node through a first charge sharing path, in a boost mode of the power supply, sharing a charge from a second capacitor connected to the second switching node to a second bootstrap capacitor connected to the first switching node through a second charge sharing path, and in a buck-boost mode of the power supply, sharing a charge from the first capacitor to the first bootstrap capacitor or sharing a charge from the second capacitor to the second bootstrap capacitor through a third charge sharing path.

DETAILED DESCRIPTION

Figure 1:
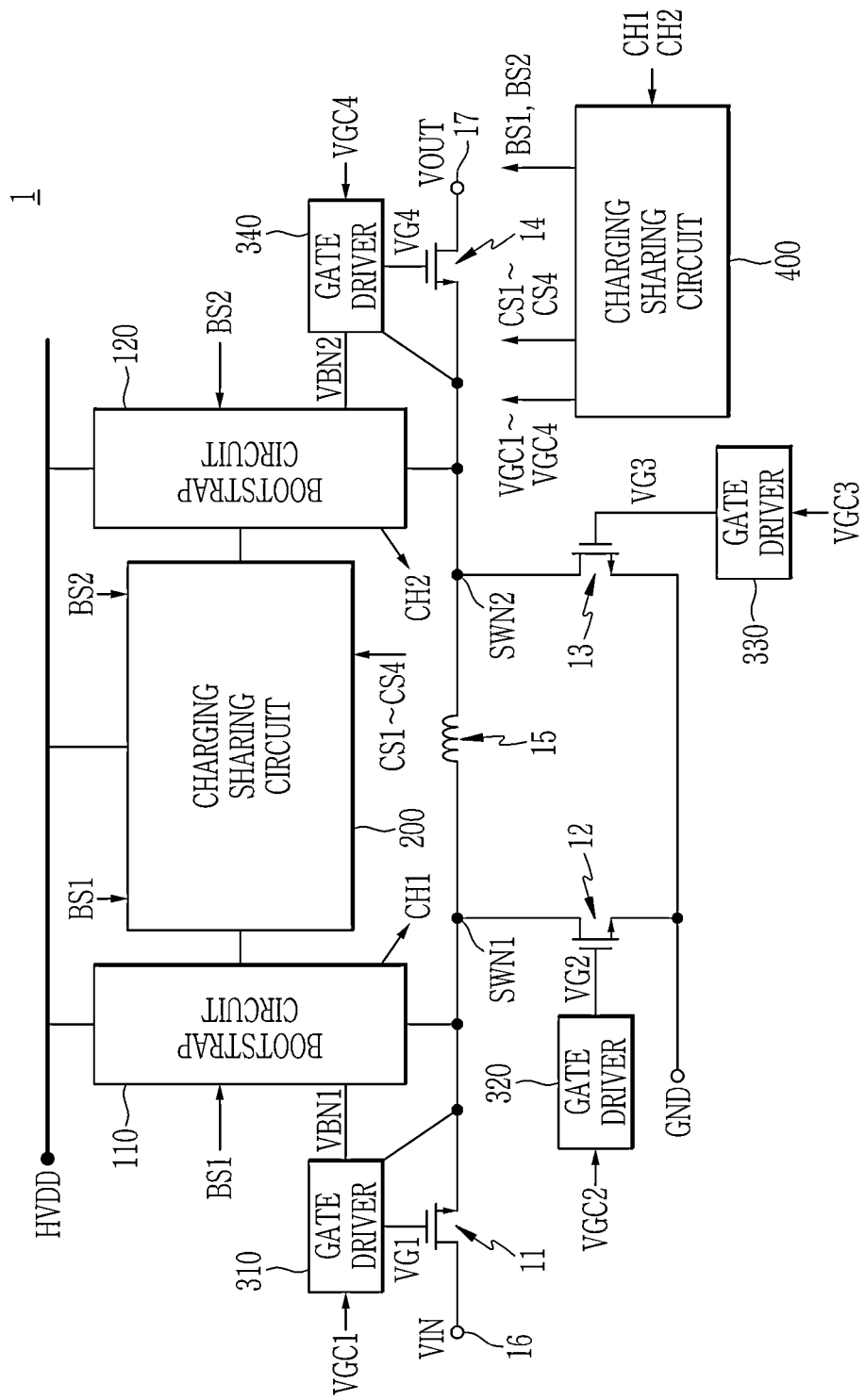
FIG. 1 is a circuit diagram illustrating a power supply according to some example embodiments.

Various example embodiments will be described more fully hereinafter with reference to the accompanying drawings, in which some example embodiments of the invention concepts are shown. As those of ordinary skill in the art would realize, the example embodiments may be modified in various different ways, without departing from the spirit or scope of the invention concepts.

In order to clearly describe the invention concepts, parts or portions that are irrelevant to the description are omitted, and identical or similar constituent elements throughout the specification are denoted by the same reference numerals. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for purpose of distinguishing one constituent element from other constituent elements.

FIG. 1 is a circuit diagram illustrating a power supply (or a power supply device) according to some example embodiments.

In FIG. 1, the power supply is implemented as a converter 1. The converter 1 may convert an input voltage VIN to a target voltage so as to provide an output voltage VOUT. The converter 1 may include a plurality of power switches that perform a switching operation to convert the input voltage VIN to the target voltage, and an energy transfer element that transfers energy according to the switching operation. FIG. 1 shows an example of the converter 1 implemented with four power switches (four electric power switches) 11-14 and an inductor 15 that is the energy transfer element; however, example embodiments are not necessarily limited thereto.

The converter 1 may include the four power switches 11-14, the inductor 15, two bootstrap circuits 110 and 120, a charge sharing circuit 200, two gate drivers 310 and 340, and a switching control circuit 400.

The power switch 11 is connected between an input terminal 16 at which the input voltage VIN is provided and a switching node SWN1. The power switch 12 is connected between the switching node SWN1 and a ground GND. The power switch 13 is connected between a switching node SWN2 and the ground GND. The power switch 14 is connected between an output terminal 17 to which the output voltage VOUT is output and the switching node SWN2. The inductor 15 is connected between the switching node SWN1 and the switching node SWN2. The input terminal 16 may be connected to a power source, and the output terminal 17 may be connected to a load. Although not shown in FIG. 1, a low-pass filter that removes pr at least partly removes a noise of the input voltage VIN may be connected to the input terminal 16, and an output capacitor for smoothing the output voltage VOUT may be connected to the output terminal 17. A gate signal (one of VG1 to VG4) may be provided at a gate of each of the plurality of power switches 11 to 14.

The converter 1 may operate in one of three modes in a process of converting the input voltage VIN to the target voltage. For example, in a buck mode, the converter 1 may step down the input voltage VIN to convert the input voltage VIN to the target voltage. In a boost mode, the converter 1 may step up the input voltage VIN to convert the input voltage VIN to the target voltage. In a buck-boost mode, the converter 1 may step down or step up the input voltage VIN to convert the input voltage VIN to the target voltage. In the buck-boost mode, the converter 1 may operate alternately in the buck mode and the boost mode.

The converter 1 shown in FIG. 1 is an example of a converter capable of operating in three modes, and example embodiments are not limited thereto. The two power switches 11 and 12 perform switching operations in the buck mode and the buck-boost mode, and in the boost mode, the power switch 11 is in an on state and the power switch 12 is in an off state. The two power switches 13 and 14 perform switching operations in a boost mode and a buck-boost mode. In the buck mode, the power switch 14 is in an on state and the power switch 13 is in an off state.

In the buck mode, a voltage of the switching node SWN1 may toggle according to switching operations of the power switches 11 and 12, and a voltage of the switching node SWN2 may be the output voltage VOUT. In the boost mode, the voltage of the switching node SWN2 toggles according to the switching operations of the power switches 13 and 14, and the voltage of the switching node SWN1 may be the input voltage VIN. In the buck-boost mode, the voltage of the switching node SWN1 may toggle according to the switching operations of the power switches 11 and 12, and the voltage of the switching node SWN2 may toggle according to the switching operations of the power switches 13 and 14.

The bootstrap circuit 110 may be connected between a power supply voltage, such as a dynamically determined power supply voltage (or, alternatively, a predetermined power supply voltage) HVDD and the switching node SWN1, and may provide a voltage VBN1 bootstrapped based on the voltage of the switching node SWN1 to the gate driver 310 using the power supply voltage HVDD. The voltage VBN1 may be a gate-on voltage for turning on the power switch 11, e.g., may be greater than a threshold voltage of the power switch 11.

The bootstrap circuit 120 may be connected between the power supply voltage HVDD and the switching node SWN2, and may provide a voltage VBN2 bootstrapped based on the voltage of the switching node SWN2 to the gate driver 340 using the power supply voltage HVDD. The voltage VBN2 may be a gate-on voltage for turning on the power switch 14, e.g., may be greater than a threshold voltage of the power switch 14.

The gate driver 310 may generate the gate signal VG1 according to a gate control signal VGC1, a gate driver 320 may generate a gate signal VG2 according to a gate control signal VGC2, a gate driver 330 may generate a gate signal VG3 according to a gate control signal VGC3, and the gate driver 340 may generate the gate signal VG4 according to a gate control signal VGC4. The gate driver 310 may provide an on-level gate signal VG1 according to the gate control signal VGC1 indicating an on state, and may provide an off-level gate signal VG1 according to the gate control signal VGC1 indicating an off state. According to some example embodiments, an on level of the gate signal VG1 may depend on the voltage VBN1 provided from the bootstrap circuit 110, and an off level of the gate signal VG1 may depend on the voltage of the switching node SWN1. The gate driver 340 may provide an on-level gate signal VG4 according to the gate control signal VGC4 indicating an on state, and may provide an off-level gate signal VG4 according to the gate control signal VGC4 indicating an off state. According to some example embodiments, an on level of the gate signal VG4 may depend on the voltage VBN2 provided from the bootstrap circuit 120, and an off level of the gate signal VG4 may depend on the voltage of the switching node SWN2. The gate driver 320 may provide an on-level gate signal VG2 according to the gate control signal VGC2 indicating an on state, and may provide an off-level gate signal VG2 according to the gate control signal VGC2 indicating an off state. The gate driver 330 may provide an on-level gate signal VG3 according to the gate control signal VGC3 indicating an on state, and may provide an off-level gate signal VG3 according to the gate control signal VGC3 indicating an off state.

The charge sharing circuit 200 may store a charge using the power supply voltage HVDD, may provide a charge sharing path for the bootstrap circuit 110 from the stored charge based on a difference between the voltage VBN1 provided to turn on the power switch 11 and the voltage of the switching node SWN1, and may provide a charge sharing path for the bootstrap circuit 120 from the stored charge based on a difference between the voltage VBN2 provided to turn on the power switch 14 and the voltage of the switching node SWN2.

The switching control circuit 400 may control a power conversion operation of the converter 1. For example, the switching control circuit 400 may generate the plurality of gate control signals VGC1 to VGC4 that control switching operations of the power switches 11-14, may generate bootstrap signals BS1 and BS2 that control the bootstrap circuits 110 and 120, and may receive signals (hereinafter referred to as charging signals) CH1 and CH2 corresponding to charging voltages of the bootstrap circuits 110 and 120 to generate sharing control signals CS1-CS4 that control the charge sharing circuit 200. A detailed operation and related signals of the switching control circuit 400 will be described later.

The electrical and/or physical properties of each of the power supply switches 11, 12, 13, and 14 may be the same as each other; alternatively, one or more of the power supply switches 11, 12, 13, and 14 may have a different electrical and/or physical property than others of the power supply switches 11, 12, 13, and 14. For example, one or more of a threshold voltage and/or a gate width may be different for one or more of the power supply switches 11, 12, 13, and 14.

Figure 2:
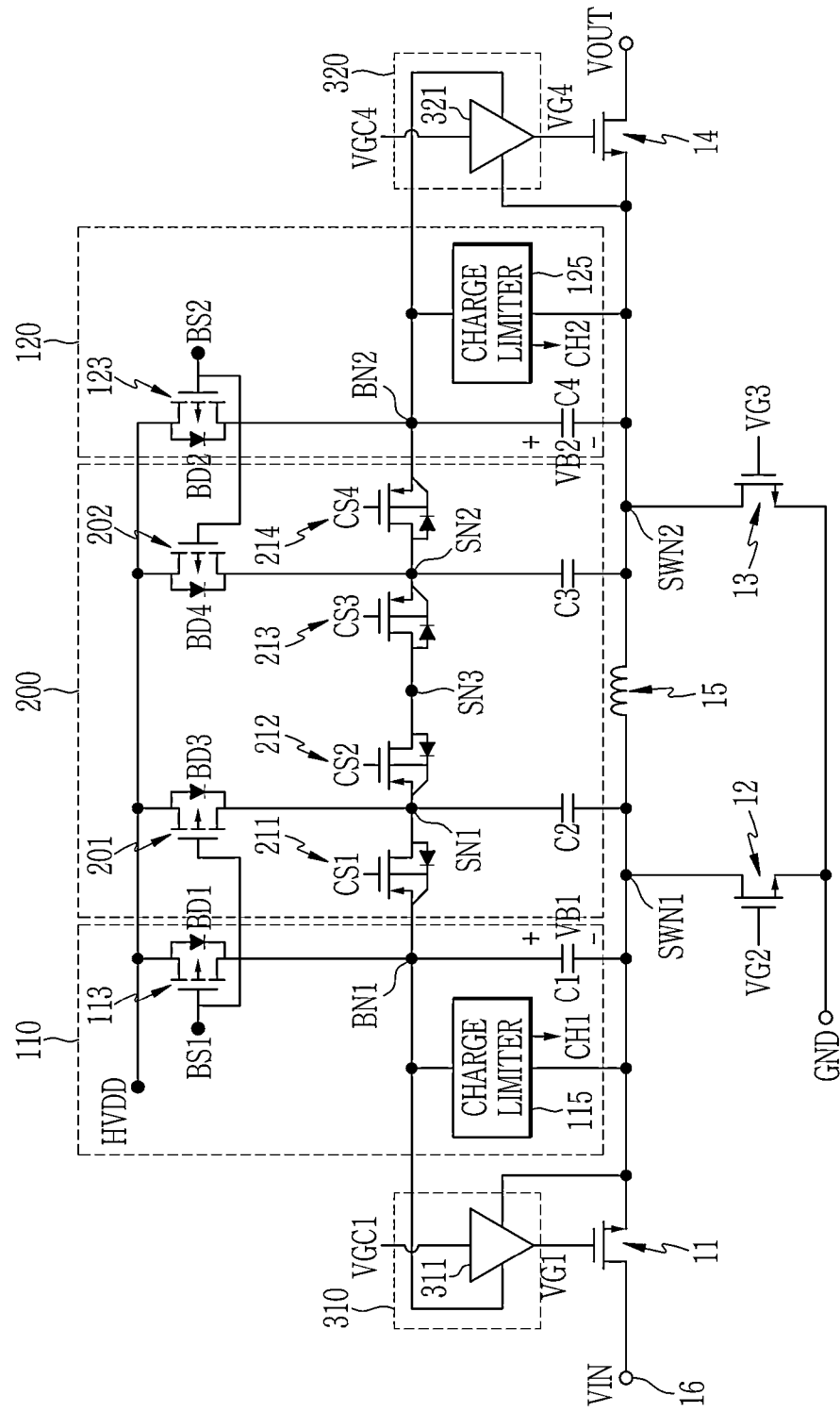
FIG. 2 is a circuit diagram illustrating in detail some configurations of a converter according to some example embodiments.

FIG. 2 is a circuit diagram illustrating in detail some configurations of the converter according to some example embodiments.

As shown in FIG. 2, the bootstrap circuit 110 includes a charge limiter (or a charging limiter) 115, a charging transistor 113, and a bootstrap capacitor C1. During an on-period of the charging transistor 113, the bootstrap capacitor C1 may be charged by the power supply voltage HVDD. The charge limiter 115 may compare a voltage (hereinafter referred to as a bootstrap voltage) VB1 charged at the bootstrap capacitor C1 with a predetermined reference voltage, and may generate the charging signal CH1 according to the comparison result. The switching control circuit 400 may receive the charging signal CH1, and may determine whether the bootstrap capacitor C1 is charged based on the charging signal CH1.

The charging transistor 113 may include one end (e.g., a drain or a source) to which the power supply voltage HVDD is supplied, another end (e.g., a source or a drain) connected to a node BN1, and a control end (e.g., a gate) to which a bootstrap signal BS1 is provided. A body diode BD1 may be formed in a drain-source direction of the charging transistor 113. The charging transistor 113 may be turned on by an on-level bootstrap signal (e.g., a low-level bootstrap signal) BS1, and may be turned off by an off-level bootstrap signal (e.g., a high-level bootstrap signal) BS1. The bootstrap capacitor C1 may include one end connected to the node BN1 and another end connected to the switching node SWN1. The charge limiter 115 may be connected between the node BN1 and the switching node SWN1, may compare a voltage difference between the node BN1 and the switching node SWN1 (that is, the bootstrap voltage VB1) with a particular (e.g., a predetermined) threshold voltage VTH1, and may generate the charging signal CH1 corresponding to the comparison result.

Figure 3:
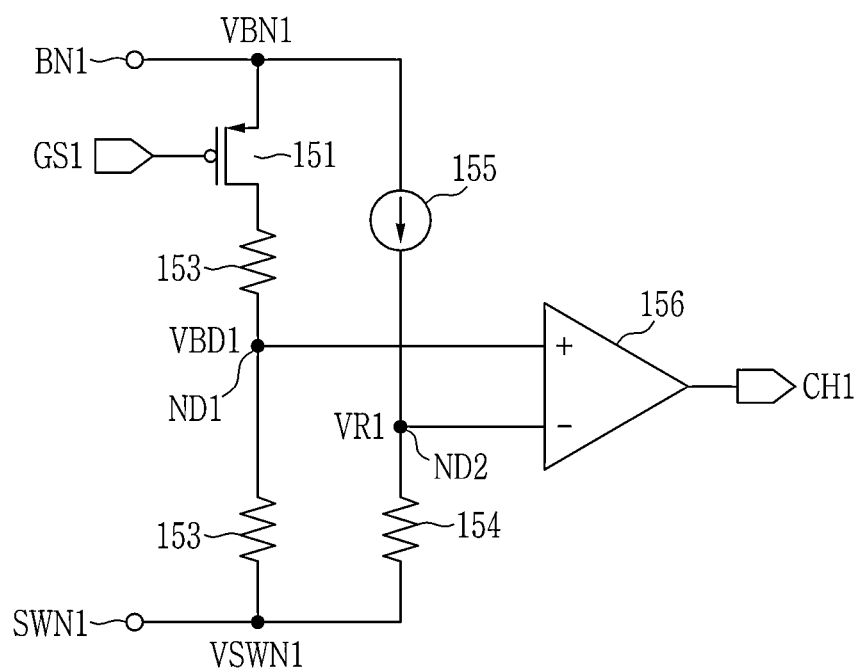
FIG. 3 is a circuit diagram illustrating a configuration of a charge limiter according to some example embodiments.

FIG. 3 is a circuit diagram illustrating a configuration of the charge limiter according to some example embodiments.

The charge limiter 115 includes a transistor 151, a number of resistors such as three resistors 152-154, a current source 155, and a comparator 156.

The transistor 151 includes an end such as a source connected to the node BN1, another end such as a drain connected to one end of the resistor 152, and a gate to which a gate signal GS1 is provided. The transistor 151 may be in an on state during a period of monitoring the bootstrap voltage VB1. The transistor 151 may be a PMOS transistor; example embodiments are not limited thereto. The transistor 151 may be a planar transistor or a three-dimensional transistor; example embodiments are not limited thereto. The switching control circuit 400 may provide an on-level gate signal GS1 during the monitoring period. Another end of the resistor 152 is connected to one end of the resistor 153, and another end of the resistor 153 is connected to the switching node SWN1. A voltage VBD1 of a node ND1 to which the other end of the resistor 152 and one end of the resistor 153 are connected may be a voltage obtained by dividing the bootstrap voltage VB1 by the two resistors 152 and 153. The current source 155 may be connected between the node BN1 and a node ND2, and may provide a constant current using the voltage VBN1 of the node BN1. The resistor 154 is connected between the node ND2 and the switching node SWN1. The constant current provided from the current source 155 may flow through the resistor 154 to generate a voltage at the node ND2, and the voltage may be a reference voltage VR1. The reference voltage VR1 may be set to correspond to the threshold voltage VTH1.

The comparator 156 may include a positive terminal connected to the node ND1 and a negative terminal connected to the node ND2, may generate and output a high-level charging signal CH1 when an input of the positive terminal is greater than or equal to an input of the negative terminal, and may generate and output a low-level charging signal CH1 when the input of the positive terminal is less than the input of the negative terminal. For example, when the voltage VBD1 is greater than or equal to the reference voltage VR1, the comparator 156 may output the high-level charging signal CH1, and when the voltage VBD1 is less than the reference voltage VR1, the comparator 156 may output the low-level charging signal CH1. The switching control circuit 400 may block charge sharing for the bootstrap capacitor C1 according to the high-level charging signal CH1. For example, the switching control circuit 400 may turn off at least one of sharing transistors CS2 and CS3. As described above, by limiting a level of the bootstrap voltage VB1, it is possible to prevent or reduce the likelihood of the bootstrap capacitor C1 from being damaged due to an internal pressure.

Referring back to FIG. 2, the bootstrap circuit 120 includes a charge limiter (or a charging limiter) 125, a charging transistor 123, and a bootstrap capacitor C4. During an on-period of the charging transistor 123, the bootstrap capacitor C4 may be charged by the power supply voltage HVDD. The charge limiter 125 may compare a voltage (hereinafter referred to as bootstrap voltage) VB2 charged at the bootstrap capacitor C4 with a predetermined reference voltage, and may generate the charging signal CH2 according to the comparison result. The switching control circuit 400 may receive the charging signal CH2, and may determine whether the bootstrap capacitor C4 is charged based on the charging signal CH2.

The charging transistor 123 may include one end (e.g., a drain) to which the power supply voltage HVDD is supplied, another end (e.g., a source) connected to a node BN2, and a control end (e.g., a gate) to which a bootstrap signal BS2 is provided. A body diode BD2 may be formed in a drain-source direction of the charging transistor 123. The charging transistor 123 may be turned on by an on-level bootstrap signal (e.g., a low-level bootstrap signal) BS2, and may be turned off by an off-level bootstrap signal (e.g., a high-level bootstrap signal) BS2. The bootstrap capacitor C4 may include one end connected to the node BN2 and the other end connected to the switching node SWN2. The charge limiter 125 may be connected between the node BN2 and the switching node SWN2, may compare a voltage difference between the node BN2 and the switching node SWN2 (that is, the bootstrap voltage VB2) with a predetermined threshold voltage VTH2, and may generate the charging signal CH2 corresponding to the comparison result.

Figure 4:
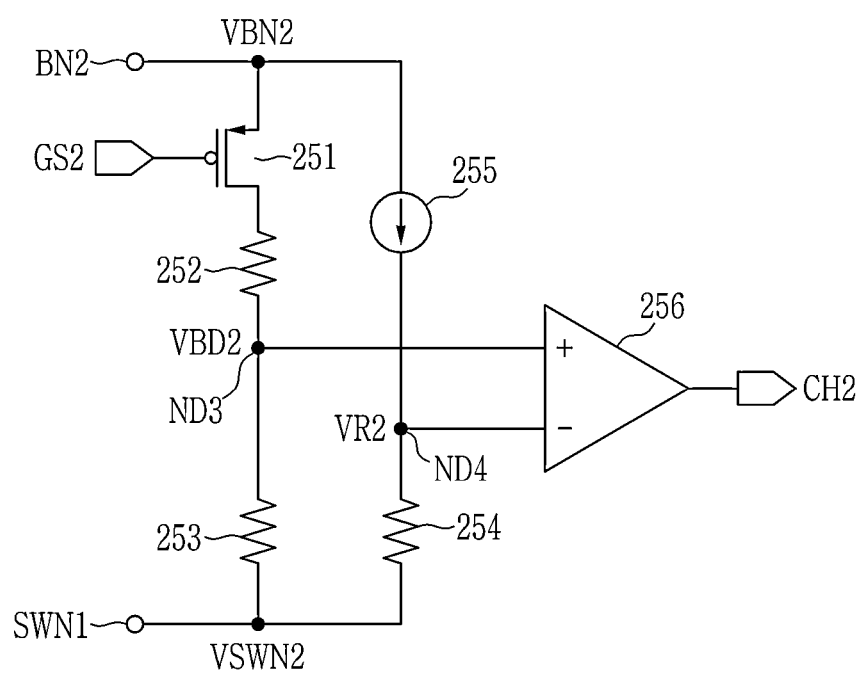
FIG. 4 is a circuit diagram illustrating a configuration of a charge limiter according to some example embodiments.

FIG. 4 is a circuit diagram illustrating a configuration of the charge limiter according to some example embodiments.

The charge limiter 125 includes a transistor 251, three resistors 252-254, a current source 255, and a comparator 256.

The transistor 251 includes a source connected to the node BN1, a drain connected to one end of the resistor 252, and a gate to which a gate signal GS2 is provided. The transistor 251 may be in an on state during a period of monitoring the bootstrap voltage VB2. The switching control circuit 400 may provide an on-level gate signal GS2 during the monitoring period. The other end of the resistor 252 is connected to one end of the resistor 253, and the other end of the resistor 253 is connected to the switching node SWN2. A voltage VBD2 of a node ND3 to which the other end of the resistor 252 and one end of the resistor 253 are connected may be a voltage obtained by dividing the bootstrap voltage VB2 by the two resistors 252 and 253. The current source 255 may be connected between the node BN1 and the node ND2, and may provide a constant current using the voltage VBN1 of the node BN1. The resistor 254 is connected between the node ND2 and the switching node SWN1. The constant current provided from the current source 255 may flow through the resistor 254 to generate a voltage at the node ND4, and the voltage may be a reference voltage VR2. The reference voltage VR2 may be set to correspond to the threshold voltage VTH2.

The comparator 256 may include a positive terminal connected to the node ND3 and a negative terminal connected to the node ND4, may generate and output a high-level charging signal CH2 when an input of the positive terminal is greater than or equal to an input of the negative terminal, and may generate and output a low-level charging signal CH2 when the input of the positive terminal is less than the input of the negative terminal. For example, when the voltage VBD2 is greater than or equal to the reference voltage VR2, the comparator 256 may output the high-level charging signal CH2, and when the voltage VBD2 is less than the reference voltage VR2, the comparator 256 may output the low-level charging signal CH2. The switching control circuit 400 may block charge sharing for the bootstrap capacitor C4 according to the high-level charging signal CH2. For example, the switching control circuit 400 may turn off at least one of the sharing transistors CS2 and CS3. As described above, by limiting the level of the bootstrap voltage VB2, it is possible to prevent or reduce the bootstrap capacitor C4 from being damaged due to an internal voltage.

In some example embodiments, the charge limiter 115 may have the same design or similar design as the charge limiter 125; example embodiments are not limited thereto. In some example embodiments, a resistance of each of the resistors 152, 153, 154 included in the charge limiter 115 may be the same as a resistance of each of the respective resistors 252, 253, 254 included in the charge limiter 125; example embodiments are not limited thereto.

Referring back to FIG. 2, the charge sharing circuit 200 may include two charging transistors 201 and 202, four sharing transistors 211 to 214, and two capacitors C2 and C3. A capacity (or a capacitance) of the capacitor C2 may be equal to or less than a ratio such as a predetermined first ratio (e.g., 1/3) of a capacitance of the bootstrap capacitor C1, and a capacity of the capacitor C3 may be equal to or less than a ratio such as a predetermined second ratio (e.g., 1/3) of a capacity of the bootstrap capacitor C4. The first ratio and the second ratio may be changed according to design and/or may be dynamically determined. As the capacities of the capacitors C2 and C3 increase, a speed at which a charge is transferred from each the capacitor C2 or C3 to the bootstrap capacitor C4 or C1 may be slow. Under a condition that voltages of the switching nodes SWN1 and SWN2 toggle, the first ratio and the second ratio may be determined in consideration of a time during which a charge sharing path may be provided.

The charging transistor 201 may include one end (e.g., a drain) to which the power supply voltage HVDD is supplied, another end (e.g., a source) connected to a node SN1, and a gate to which the bootstrap signal BS1 is provided. A body diode BD3 may be formed in a drain-source direction of the charging transistor 201. The capacitor C2 may include one end connected to the node SN1 and another end connected to the switching node SWN1. The charging transistor 201 may be turned on by an on-level bootstrap signal (e.g., a low-level bootstrap signal) BS1, and may be turned off by an off-level bootstrap signal (e.g., a high-level bootstrap signal) BS1. The capacitor C2 may be charged by the power supply voltage HVDD during an on-period of the charging transistor 201.

The charging transistor 202 may include one end (e.g., a drain) to which the power supply voltage HVDD is supplied, another end (e.g., a source) connected to a node SN2, and a gate to which the bootstrap signal BS2 is provided. A body diode BD4 may be formed in a drain-source direction of the charging transistor 202. The capacitor C3 may include one end connected to the node SN2 and the other end connected to the switching node SWN2. The charging transistor 202 may be turned on by an on-level bootstrap signal (e.g., a low-level bootstrap signal) BS2, and may be turned off by an off-level bootstrap signal (e.g., a high-level bootstrap signal) BS2. The capacitor C3 may be charged by the power supply voltage HVDD during an on-period of the charging transistor 202.

The sharing transistor 211 may include one end (e.g., a source) connected to the node BN1, another end (e.g., a drain) connected to the node SN1, and a gate to which the sharing control signal CS1 is provided. The sharing transistor 212 may include one end (e.g., a source) connected to the node SN1, the other end (e.g., a drain) connected to a node SN3, and a gate to which the sharing control signal CS2 is provided. The sharing transistor 213 may include one end (e.g., a source) connected to the node SN2, another end (e.g., a drain) connected to the node SN3, and a gate to which the sharing control signal CS3 is provided. The sharing transistor 214 may include one end (e.g., a source) connected to the node BN2, another end (e.g., a drain) connected to the node SN2, and a gate to which the sharing control signal CS4 is provided.

In the buck mode, the switching control circuit 400 may provide a charge sharing path from the capacitor C2 to the capacitor C3 and the bootstrap capacitor C4 to generate on-level sharing control signals (e.g., low-level sharing control signals) CS2, CS3, and CS4 for turning on the sharing transistors 212, 213, and 214. In the boost mode, the switching control circuit 400 may provide a charge sharing path from the capacitor C3 to the bootstrap capacitor C1 and the capacitor C2 to generate on-level sharing control signals (e.g., low-level sharing control signals) CS1, CS2, and CS3 for turning on the sharing transistors 211, 212, and 213. In the buck-boost mode, the switching control circuit 400 may provide a charge sharing path between a plurality of capacitors C1-C4 to generate on-level sharing control signals (e.g., low-level sharing control signals) CS1-CS4 for turning on the sharing transistors 211-214.

The gate driver 310 may include an output buffer 311, and the output buffer 311 may include an input terminal to which the gate control signal VGC1 is input and an output terminal connected to a gate of the power switch 11. The output buffer 311 may output the gate signal VG1 of a gate-on voltage or a gate-off voltage according to the gate control signal VGC1. The gate-on voltage may be supplied to the output buffer 311 from the bootstrap capacitor C1, and the gate-off voltage may be supplied to the output buffer 311 from the switching node SWN1.

The gate driver 340 may include an output buffer 321, and the output buffer 321 may include an input terminal to which the gate control signal VGC2 is input and an output terminal connected to a gate of the power switch 14. The output buffer 321 may output the gate signal VG2 of a gate-on voltage or a gate-off voltage according to the gate control signal VGC2. The gate-on voltage may be supplied to the output buffer 321 from the bootstrap capacitor C4, and the gate-off voltage may be supplied to the output buffer 321 from the switching node SWN2.

The switching control circuit 400 may generate a voltage such as an error voltage by amplifying a voltage corresponding to a difference between the output voltage VOUT and the target voltage, and may generate a mode control signal MCS according to a result of comparing the error voltage with a sawtooth wave having a particular (e.g., dynamically determined or predetermined) period. The switching control circuit 400 may control the converter 1 in the buck mode, the boost mode, or the buck-boost mode according to the mode control signal MCS.

Figure 5:
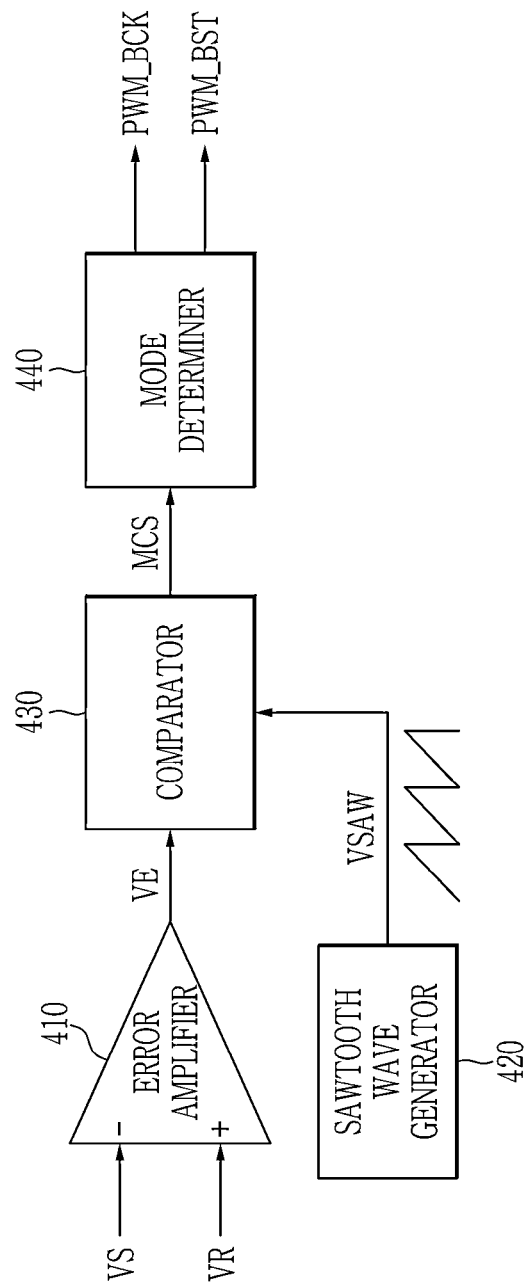
FIG. 5 is a block diagram illustrating a configuration of a switching control circuit according to some example embodiments.

FIG. 5 is a block diagram illustrating a configuration of the switching control circuit according to some example embodiments.

As shown in FIG. 5, the switching control circuit 400 may include an error amplifier 410, a sawtooth wave generator 420, a comparator 430, and a mode determiner 440.

The error amplifier 410 may generate the error voltage VE by amplifying a difference between a sensing voltage VS corresponding to the output voltage VOUT and a reference voltage VR corresponding to the target voltage. For example, the sensing voltage VS may be provided to a negative terminal of the error amplifier 410, and the reference voltage VR may be provided to a positive terminal of the error amplifier 410.

The sawtooth wave generator 420 may generate a sawtooth wave VSAW having a particular period.

The comparator 430 may generate the mode control signal MCS according to a result of comparing the error voltage VE with the sawtooth wave VSAW. For example, the comparator 430 may generate a high-level mode control signal MCS in an interval (or a period) where a voltage of the sawtooth wave VSAW is greater than or equal to the error voltage VE, and may generate a low-level mode control signal MCS when the voltage of the sawtooth wave VSAW is smaller than the error voltage VE.

The mode determiner 440 may generate a buck control signal PWM_BCK for controlling the buck mode and a boost control signal PWM_BST for controlling the boost mode according to the mode control signal MCS.

For example, as the output voltage VOUT decreases, the error voltage VE increases and the interval where the sawtooth wave VSAW is greater than or equal to the error voltage VE decreases, so that a high-level interval (hereinafter referred to as an on-duty) of the mode control signal MCS decreases. The mode determiner 440 may generate the buck control signal PWM_BCK increasing the on-duty of the power switch 11 in the buck mode according to a decrease in the on-duty of the mode control signal MCS. The mode determiner 440 may generate the buck control signal PWM_BCK and the boost control signal PWM_BST for changing a mode of the converter 1 from the buck mode to the boost mode when the on-duty of the mode control signal MCS decreases to a predetermined threshold value or less. The mode determiner 440 may increase the on-duty (e.g., a high-level interval) of the buck control signal PWM_BCK that controls the on-duty of the power switch 11 in the buck mode as the on-duty of the mode control signal MCS decreases. When the on-duty of the mode control signal MCS decreases to the predetermined threshold value or less, the mode determiner 440 may switch an operating mode of the converter 1 from the buck mode to the boost mode, and may generate the buck control signal PWM_BCK with an on-duty (or an on-duty ratio) of 100%. For example, the power switch 11 may be always controlled to be in an on state according to the buck control signal PWM_BCK having the on-duty of 100%.

As the output voltage VOUT increases, the error voltage VE decreases and an interval in which the sawtooth wave VSAW is equal to or greater than the error voltage VE increases, so that the on-duty of the mode control signal MCS is increased. The mode determiner 440 may generate the boost control signal PWM_BST for increasing the on-duty of the power switch 14 in the boost mode according to an increase in the on-duty of the mode control signal MCS. The mode determiner 440 may generate the buck control signal PWM_BCK and the boost control signal PWM_BST for changing the operating mode of the converter 1 from the boost mode to the buck mode when the on-duty of the mode control signal MCS increases to a predetermined threshold value or more. The mode determiner 440 may increase an off-duty (a low-level interval) of the boost control signal PWM_BST that controls the on-duty of the power switch 14 in the boost mode as the on-duty of the mode control signal MCS increases. When the on-duty of the mode control signal MCS increases to the particular (e.g., predetermined) threshold or more, the mode determiner 440 may switch the operating mode of the converter 1 from the boost mode to the buck mode, and may generate the boost control signal PWM_BST with an off-duty (or an off-duty ratio) of 100%. For example, the power switch 14 may be always controlled to be in an on state according to the boost control signal PWM_BST with the off-duty of 100%.

When the on-duty of the mode control signal MCS repeatedly increases and decreases according to a variation of the output voltage VOUT, the switching control circuit 400 may adjust the on-duty of the buck control signal PWM_BCK and the off-duty of the boost control signal PWM_BST according to the mode control signal MCS. As the on-duty of the buck control signal PWM_BCK increases, an on-period of the power switch 11 increases, and as the off-duty of the boost control signal PWM_BST increases, an on-period of the power switch 14 increases. In the buck mode, the power switch 11 and the power switch 12 may perform a switching operation according to a particular (e.g., dynamically determined or predetermined) switching period, an on-period of the power switch 12 may decrease as much as the on-period of the power switch 11 increases, and an interval during which an electric current flows through the inductor 15 may increase as the on-period of the power switch 11 increases, so that electric power transferred to the output terminal may increase. In the boost mode, the power switch 13 and the power switch 14 may perform a switching operation according to a predetermined switching period, an on-period of the power switch 13 may decrease as much as the on-period of the power switch 14 increases, and the interval during which the electric current flows through the inductor 15 may decrease as the on-period of the power switch 13 decreases, so that electric power transferred to the output terminal may decrease. In addition, the power switch 14 is in an on state in the buck mode, and the power switch 11 is in an on state in the boost mode.

Hereinafter, an operation of the converter in the buck mode will be described with reference to FIGS. 6 to 8.

Figure 6:
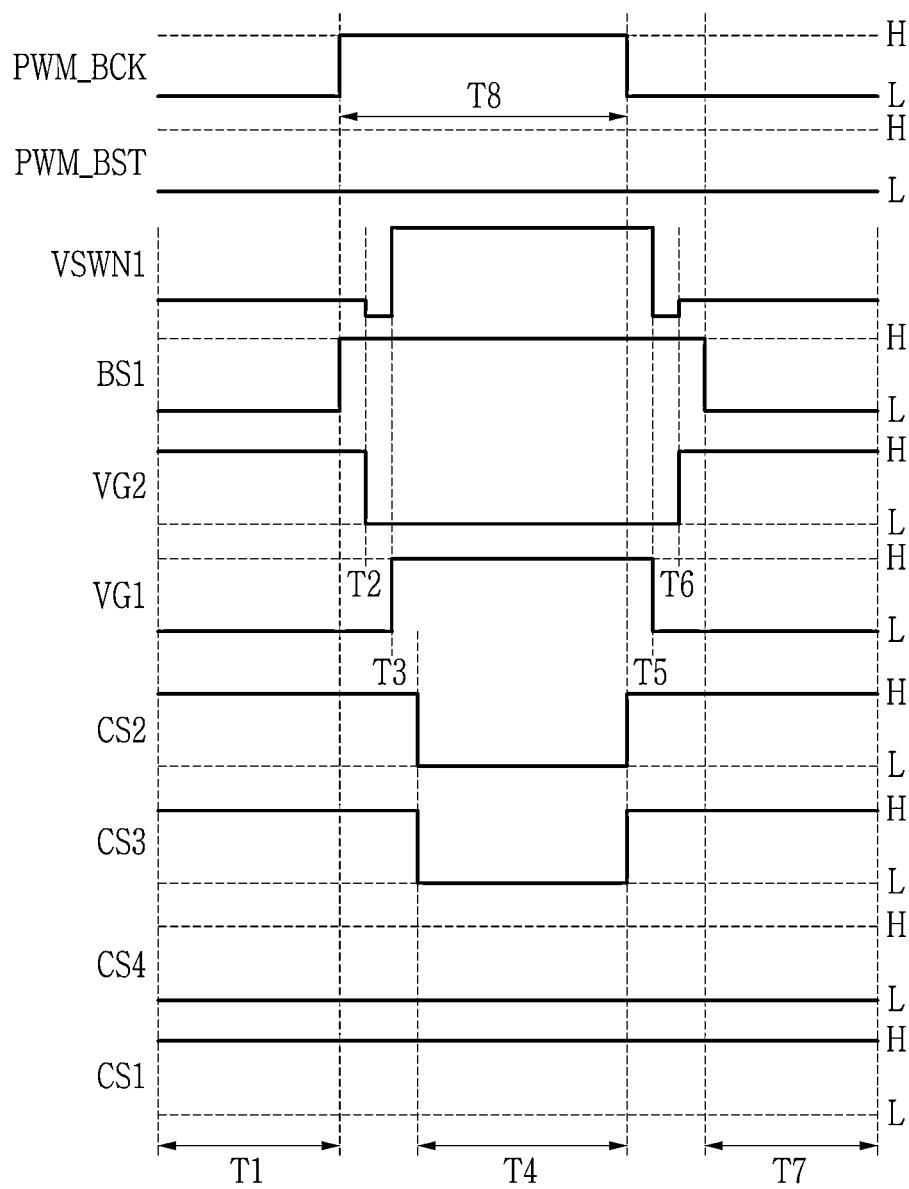
FIG. 6 is a waveform diagram of a plurality of signals for describing an operation of the converter in a buck mode.

FIG. 6 is a waveform diagram of a plurality of signals for describing an operation of the converter in the buck mode.

FIG. 6 is the waveform diagram of the plurality of signals under a condition that the charging signal CH2 is at a low level and the bootstrap voltage VB2 is less than a predetermined threshold voltage. FIG. 6 shows the waveform diagram of the plurality of signals for a predetermined period (for example, a period including at least one switching period of the power switch 11 and the power switch 12). Waveforms of the plurality of signals shown in FIG. 6 may be periodically repeated. FIG. 6 shows the waveforms in the buck mode in which the buck control signal PWM_BCK has an on-duty during an interval T8 and the boost control signal PWM_BST has an on-duty of 100%.

In the buck mode, the bootstrap capacitor C1 may not participate in charge sharing. The charge sharing in the buck mode may be performed by or based on energy stored in the capacitor C2. Accordingly, as shown in FIG. 6, in the buck mode, the sharing control signal CS1 may be at an off level H, the sharing control signal CS4 may be at an on level L, the sharing transistor 211 may be in an off state, and the sharing transistor 214 may be in an on state.

In an interval T1, the bootstrap signal BS1 may be at an on level L and the charging transistor 113 and the charging transistor 201 may be in an on state, and the bootstrap capacitor C1 and the capacitor C2 may be charged by the power supply voltage HVDD. Since the gate signal VG2 is at an on level H in the interval T1, the power switch (or a power transistor) 12 may be in an on state and the switching node SWN1 may be connected to the ground GND. At a time point T2, the gate signal VG2 may become an off level L so that the power switch 12 is turned off. Since the sharing control signals CS2 and CS3 are at an off level H in the interval T1, the sharing transistors 212 and 213 may be in an off state.

At a time point T3, the gate signal VG1 may become an on level H so that the power switch 11 is turned on and the input terminal 16 and the switching node SWN1 are connected, and a voltage VSWN1 of the switching node SWN1 may rise according to the input voltage VIN. Then, voltages of the node BN1 and the node SN1 may be bootstrapped by the input voltage VIN. Subsequently, during an interval T4, the sharing control signals CS2 and CS3 may become an on level L and the sharing transistors 212 and 213 may be in an on state. Then, a charge may flow from the capacitor C2 to the capacitor C3 and the bootstrap capacitor C4 through the sharing transistors 212, 213, and 214 that are in an on state, and the capacitor C3 and the bootstrap capacitor C4 may be charged.

The gate signal VG1 synchronized with a falling edge of the buck control signal PWM_BCK at a time point T5 may become an off level L so that the power switch 11 is turned off and the input terminal 16 and the switching node SWN1 are separated. The gate signal VG2 may become an on level H at a time point T6 when a dead time has elapsed from the time point T5 so that the power switch 12 is turned on and the switching node SWN1 is connected to the ground GND. The gate signal VG2 may be maintained at a high level according to an arbitrary signal controlling an on-time of the power switch 12, and then may be lowered to a low level.

Subsequently, in an interval T7, the bootstrap signal BS1 may be at an on level L and the charging transistor 113 and the charging transistor 201 may be in an on state, and the bootstrap capacitor C1 and the capacitor C2 may be charged by the power supply voltage HVDD.

If the bootstrap voltage VB2 is greater than or equal to a threshold voltage such as a dynamically determined (or, predetermined) threshold voltage, at least one of the sharing control signals CS2 and CS3 may be at an off level H during the interval T4 of FIG. 6. Then, the charge sharing path from the capacitor C2 to the capacitor C3 and the bootstrap capacitor C4 is not formed.

Figure 7:
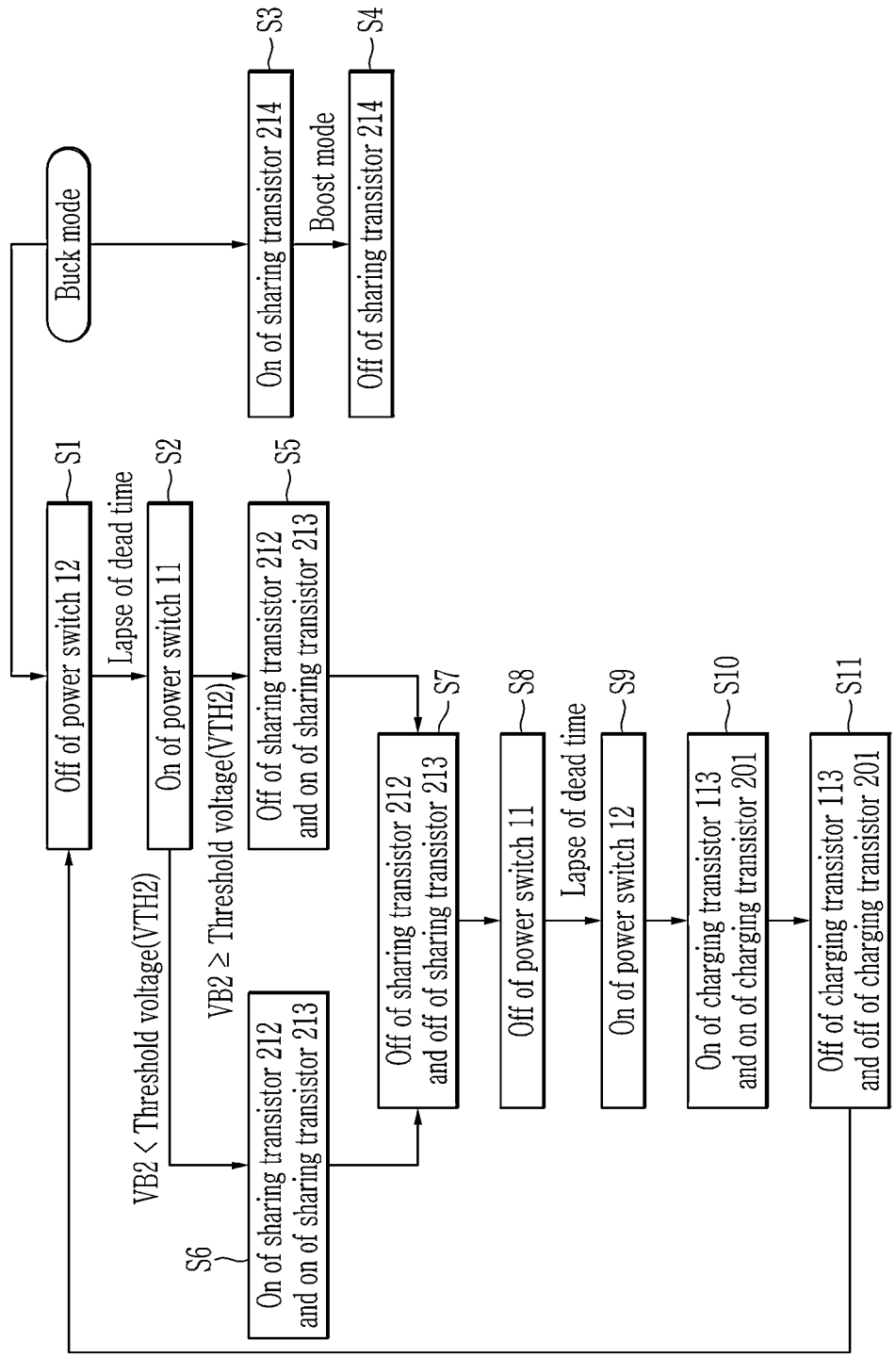
FIG. 7 is a flowchart illustrating an operation of the converter in the buck mode according to some example embodiments.

FIG. 7 is a flowchart illustrating an operation of the converter in the buck mode according to some example embodiments.

Each step shown in FIG. 7 may be performed under a control of the switching control circuit 400.

Under a condition that the converter 1 operates in the buck mode, the power switch 12 may be turned off (S1). The power switch 11 may be turned on after a dead time elapses from a time point when the power switch 12 is turned off (S2).

In the buck mode, the sharing transistor 214 may be turned on (S3), and may be maintained in an on state during a period of operating in the buck mode. When the converter 1 operates in the boost mode, the sharing transistor 214 may be turned off (S4).

When the charge limiter 125 outputs the high-level charging signal CH2 (that is, when the bootstrap voltage VB2 is greater than or equal to the threshold voltage VTH2), the sharing transistor 213 may be turned on, and the sharing transistor 212 may be in an off state (S5). Alternatively, the sharing transistor 213 may be turned off and the sharing transistor 212 may be turned on, or both the sharing transistor 213 and the sharing transistor 212 may be turned off.

When the charge limiter 125 outputs the low-level charging signal CH2 (for example, when the bootstrap voltage VB2 is less than the threshold voltage VTH2), the sharing transistor 212 and the sharing transistor 213 may be turned on (S6). Then, a charge sharing path may be formed through the sharing transistors 212, 213, and 214 that are in an on state so that a charge is shared from the capacitor C2 to the capacitor C3 and the bootstrap capacitor C4 and the capacitor C3 and the bootstrap capacitor C4 are charged. The charge sharing operation may be performed during the interval T4 in the waveform diagram of FIG. 6.

After a particular (e.g., predetermined) on-period elapses from a time point when the step S5 or the step S6 is performed, the sharing transistors 212 and 213 may be turned off (S7). The switching control circuit 400 may generate a signal for controlling the predetermined on-period, and may control an on-duty of the sharing control signal CS2 or CS3 according to the signal. Alternatively, when a current flowing through the sharing transistors 212 and 213 is equal to or greater than a predetermined threshold value, the switching control circuit 400 may generate the sharing control signals CS2 and CS3 at an off level.

Subsequently, the power switch 11 may be turned off (S8). The power switch 12 may be turned on after a dead time elapses from a time point when the power switch 11 is turned off (S9).

The charging transistor 113 and the charging transistor 201 may be turned on by the on-level bootstrap signal BS1 in synchronization with the on time point of the power switch 12 (S10). After a particular (e.g., predetermined) on-period elapses, the charging transistor 113 and the charging transistor 201 may be turned off by the off-level bootstrap signal BS1 (S11).

The steps S1 to S11 may be repeated while the converter 1 operates in the buck mode.

Figure 8:
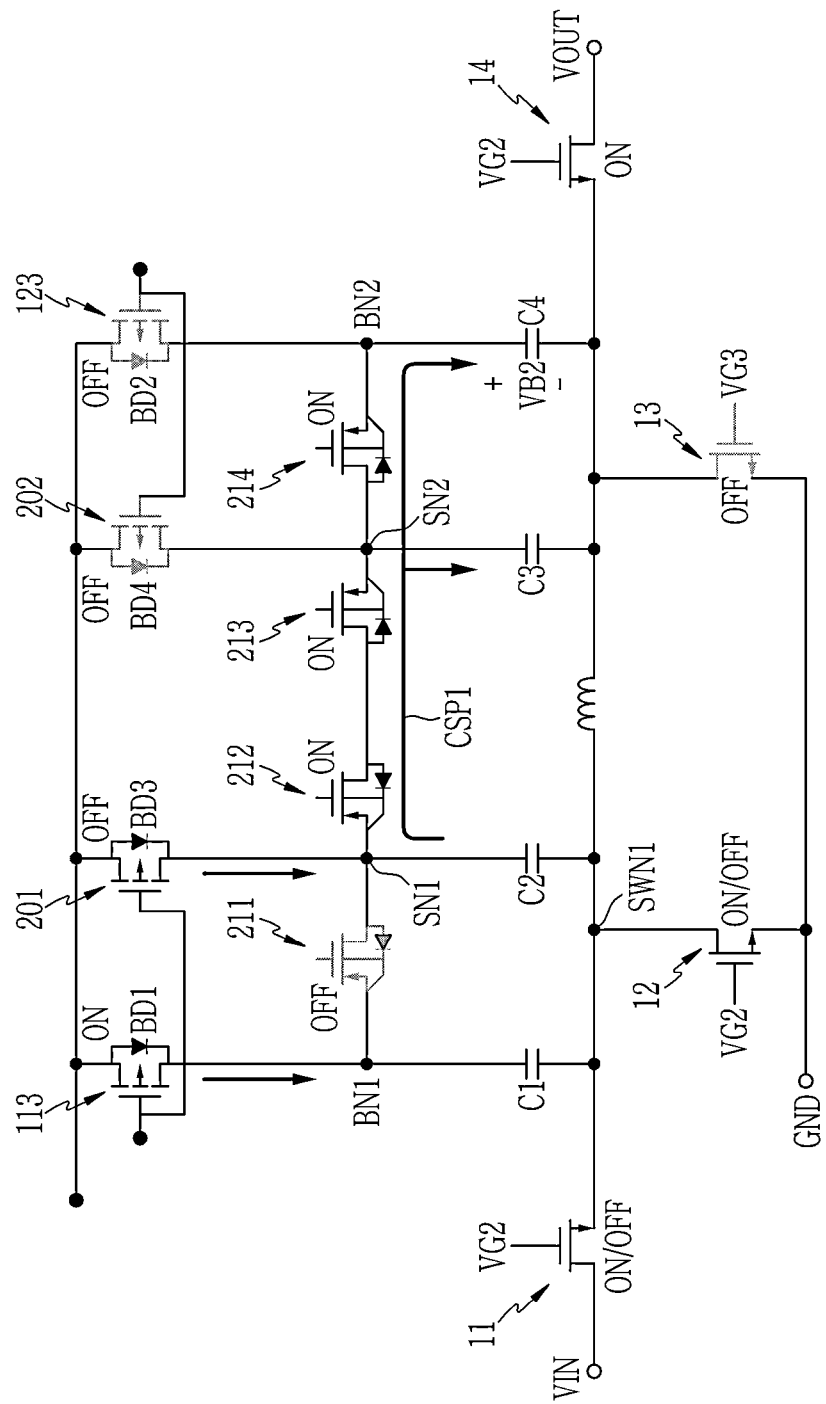
FIG. 8 is a circuit diagram illustrating an operation of a charge sharing circuit in the buck mode according to some example embodiments.

FIG. 8 is a circuit diagram illustrating an operation of the charge sharing circuit in the buck mode according to some example embodiments.

In FIG. 8, in the buck mode, the power switch 13, the sharing transistor 211, the charging transistor 123, and the charging transistor 202 controlled to be in an off state are indicated as "OFF", the power switch 14 controlled to be an on state is indicated as "ON", and the power switches 11 and 12 performing switching operations are indicated as "ON/OFF". In addition, the sharing transistors 212 to 214 forming a charge sharing path CSP1 are indicated as "ON", and the charging transistors 113 and 201 providing a path for charging the bootstrap capacitor C1 and the capacitor C2 are indicated as "ON".

As shown in FIG. 8, the charge sharing path CSP1 may be formed according to the sharing transistors 212 to 214 that are in an on state in the step S6. When the input voltage VIN is transferred to the switching node SWN1 through the power switch 11 in an on state, a voltage of the node SN1 may be bootstrapped so that the voltage of the node SN1 becomes higher than voltages of the nodes SN2 and BN2. Then, a charge charged in the capacitor C2 along the charge sharing path CSP1 may be transferred to the capacitor C3 and the bootstrap capacitor C4 so that the voltages of the nodes SN2 and BN2 rise. As described above, charge sharing may be performed through the charge sharing path CSP1 under a condition that the bootstrap voltage VB2 is less than the threshold voltage. The bootstrap voltage VB2 may be a level capable of turning on the power switch 14 by charging of the bootstrap capacitor C4. The bootstrap voltage VB2 may be provided to the gate driver 340 as a gate-on voltage.

The bootstrap capacitor C1 and the capacitor C2 may be charged by the power supply voltage HVDD through the charging transistor 113 and the charging transistor 201 that are (both) in an on state in the step S10. Since the power switch 12 is in an on state in the step S10, the bootstrap capacitor C1 and the capacitor C2 may be electrically connected between the power supply voltage HVDD and the ground GND.

Even in off states of the charging transistor 113 and the charging transistor 201, the power supply voltage HVDD may be supplied to the bootstrap capacitor C1 and the capacitor C2 through the body diodes BD1 and BD3 so that the bootstrap capacitor C1 and the capacitor C2 are charged. Then, a voltage of the node BN1 may be a voltage obtained by subtracting threshold voltages of the body diodes BD1 and BD3 from the power supply voltage HVDD. Similarly, even in off states of the charging transistor 123 and the charging transistor 202, the power supply voltage HVDD may be supplied to the bootstrap capacitor C4 and the capacitor C3 through the body diodes BD2 and BD4 so that the bootstrap capacitor C1 and the capacitor C2 are charged. Then, a voltage of the node BN2 may be a voltage obtained by subtracting threshold voltages of the body diodes BD2 and BD4 from the power supply voltage HVDD.

Figure 9:
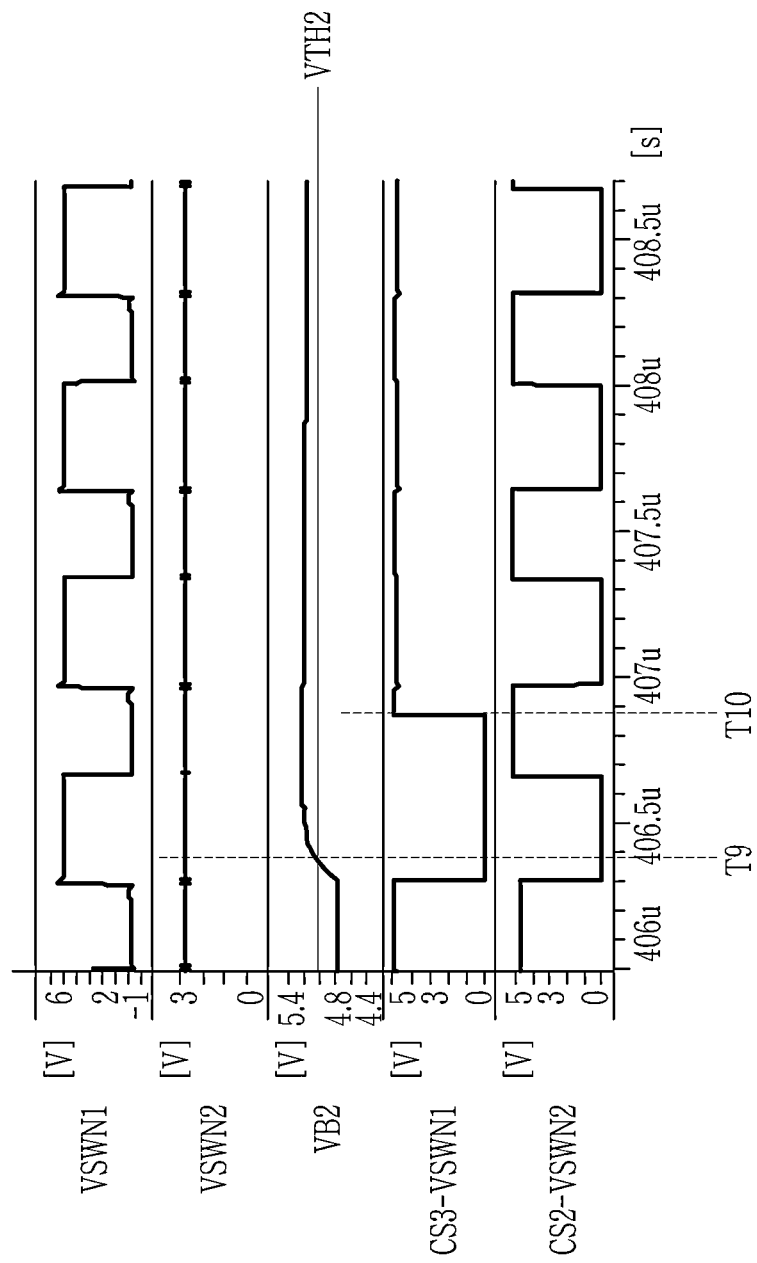
FIG. 9 is a waveform diagram illustrating an operation of controlling charge sharing in the buck mode according to some example embodiments.

FIG. 9 is a waveform diagram illustrating an operation of controlling charge sharing in the buck mode according to some example embodiments.

The waveform diagram of FIG. 9 may be or may correspond to a waveform diagram based on a simulation result (such as a SPICE simulation result).

In the waveform diagram of FIG. 9, the voltage VSWN1 of the switching node SWN1, a voltage VSWN2 of the switching node SWN2, the bootstrap voltage VB2, a voltage of the sharing control signal CS2 for the switching node SWN2, and a voltage of the sharing control signal CS3 for the switching node SWN1 are shown.

In the buck mode, the capacitor C3 and the bootstrap capacitor C4 may be charged through the charge sharing path CSP1 shown in FIG. 8. The bootstrap voltage VB2 may rise due to charging, and then may reach the threshold voltage VTH2 at a time point T9. Then, the voltage VBD2 may become a higher voltage than the reference voltage VR2, and the comparator 256 may generate the high-level charging signal CH2. The switching control circuit 400 may provide the sharing control signal CS3 for the sharing transistor 213 at an off level at a time point T10 in synchronization with the high-level charging signal CH2. Then, the sharing transistor 213 may be turned off to block the charge sharing path from the capacitor C2.

The switching control circuit 400 may turn off one of the sharing transistor 212 and the sharing transistor 213 according to the high-level charging signal CH2. When the two sharing transistors 212 and 213 are turned on after off states of the sharing transistors 212 and 213 in a case that both of the sharing transistors 212 and 213 are turned off to block the charge sharing path, a deviation between on time points of the two sharing transistors 212 and 213 may occur. This may be due to a circuit characteristic of generating the sharing control signals CS2 and CS3. However, example embodiments are not limited thereto, and the deviation between the on time points of the two sharing transistors may be ignored and/or both sharing transistors may be turned off if the deviation is not large.

Hereinafter, an operation of the converter in the boost mode will be described with reference to FIGS. 10 to 14.

Figure 10:
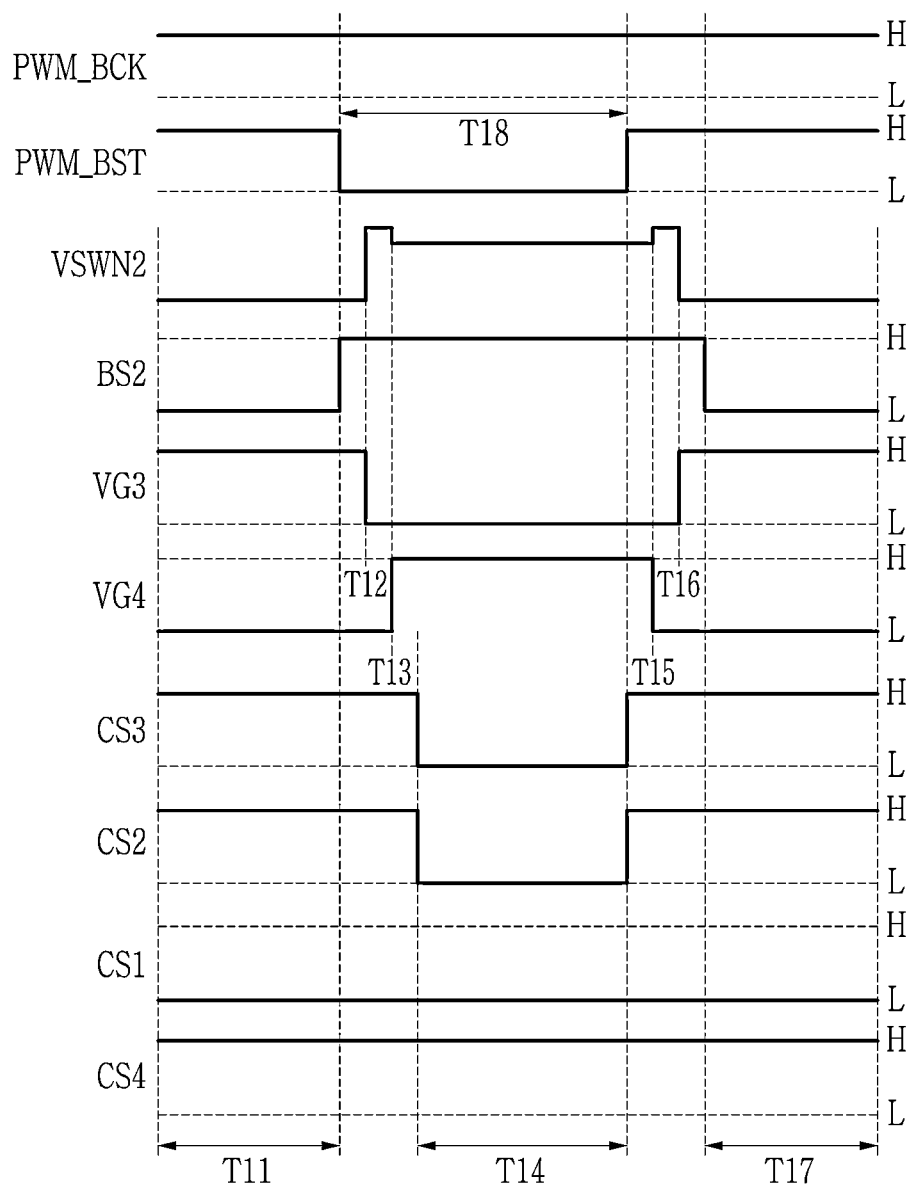
FIG. 10 is a waveform diagram of a plurality of signals for describing an operation of the converter in a boost mode.

FIG. 10 is a waveform diagram of a plurality of signals for describing the operation of the converter in the boost mode.

FIG. 10 is the waveform diagram of the plurality of signals under a condition that the charging signal CH1 is at a low level (that is, under a condition that the bootstrap voltage VB1 is less than a threshold voltage such as a predetermined threshold voltage). FIG. 10 shows waveforms of the plurality of signals for a predetermined interval (for example, an interval including at least one switching period of the power switch 13 and the power switch 14). Waveforms of the plurality of signals shown in FIG. 10 may be periodically repeated. FIG. 10 shows the waveforms in the boost mode in which the buck control signal PWM_BCK has an on-duty of 100% and the boost control signal PWM_BST has an off-duty during an interval T18.

In the boost mode, the bootstrap capacitor C4 may not participate in charge sharing. The charge sharing in the boost mode may be performed by energy stored in the capacitor C3. Accordingly, as shown in FIG. 10, in the boost mode, the sharing control signal CS4 may be at an off level H, the sharing control signal CS1 may be at an on level L, the sharing transistor 214 may be in an off state, and the sharing transistor 211 may be in an on state.

In an interval T11, the bootstrap signal BS2 may be at an on level L and the charging transistor 123 and the charging transistor 202 may be in an on state, and the capacitor C3 and the bootstrap capacitor C4 may be charged by the power supply voltage HVDD. Since the gate signal VG3 is at an on level H in the interval T11, the power switch (or a power transistor) 13 may be in an on state and the switching node SWN2 may be connected to the ground GND. At a time point T12, the gate signal VG3 may become an off level L so that the power switch 13 is turned off. Since the sharing control signals CS2 and CS3 are at an off level H in the interval T11, the sharing transistors 212 and 213 may be in an off state.

At a time point T13, the gate signal VG4 may become an on level H so that the power switch 14 is turned on and the output terminal 17 is connected to the switching node SWN2, and the voltage VSWN2 of the switching node SWN2 may rise according to the output voltage VOUT. Then, voltages of the node BN2 and the node SN2 may be bootstrapped by the output voltage VOUT. Subsequently, during an interval T14, the sharing control signals CS2 and CS3 may become an on level L and the sharing transistors 212 and 213 may be in an on state. Then, a charge may flow from the capacitor C3 to the bootstrap capacitor C1 and the capacitor C2 through the sharing transistors 211, 212, and 213 that are in an on state, and the bootstrap capacitor C1 and the capacitor C2 may be charged.

The gate signal VG4 synchronized with a rising edge of the boost control signal PWM_BST at a time point T15 may become an off level L so that the power switch 14 is turned off and the output terminal 17 and the switching node SWN2 are separated. The gate signal VG3 may become an on level H at a time point T16 when a dead time has elapsed from the time point T15 so that the power switch 13 is turned on and the switching node SWN2 is connected to the ground GND. The gate signal VG3 may be maintained at a high level according to an arbitrary signal controlling the on-time of the power switch 13, and then may be lowered to a low level.

Subsequently, in an interval T17, the bootstrap signal BS2 may be at an on level L and the charging transistor 123 and the charging transistor 202 may be in an on state, and the capacitor C3 and the bootstrap capacitor C4 may be charged by the power supply voltage HVDD.

If the bootstrap voltage VB1 is greater than or equal to a predetermined threshold voltage, at least one of the sharing control signals CS2 and CS3 may be at an off level H during the interval T14 of FIG. 10. Then, the charge sharing path from the capacitor C3 to the bootstrap capacitor C1 and the capacitor C2 is not formed.

Figure 11:
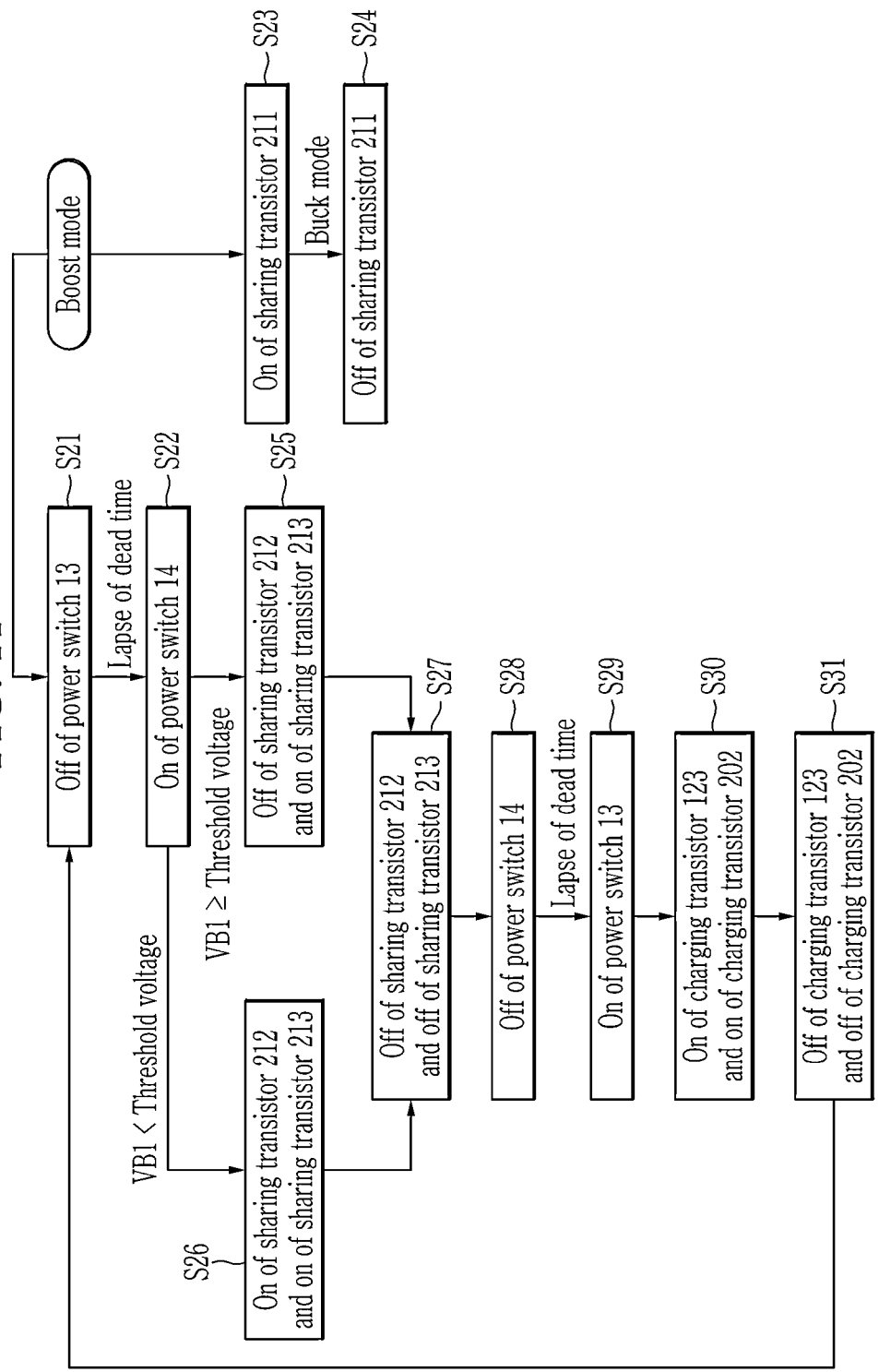
FIG. 11 is a flowchart illustrating an operation of the converter in the boost mode according to some example embodiments.

FIG. 11 is a flowchart illustrating an operation of the converter in the boost mode according to some example embodiments.

Each step shown in FIG. 11 may be performed under a control of the switching control circuit 400.

Under a condition that the converter 1 operates in the boost mode, the power switch 13 may be turned off (S21). The power switch 14 may be turned on after a dead time elapses from a time point when the power switch 13 is turned off (S22).

In the boost mode, the sharing transistor 211 may be turned on (S23), and may be maintained in an on state during a period of operating in the boost mode. When the converter 1 operates in the buck mode, the sharing transistor 211 may be turned off (S24).

When the charge limiter 115 outputs the high-level charging signal CH1 (that is, when the bootstrap voltage VB1 is greater than or equal to the threshold voltage VTH1), the sharing transistor 213 may be turned on, and the sharing transistor 212 may be in an off state (S25). Alternatively, the sharing transistor 213 may be turned off and the sharing transistor 212 may be turned on, or both the sharing transistor 213 and the sharing transistor 212 may be turned off.

When the charge limiter 115 outputs the low-level charging signal CH1 (that is, when the bootstrap voltage VB1 is less than the threshold voltage VTH1), the sharing transistor 212 and the sharing transistor 213 may be turned on (S26). Then, a charge sharing path may be formed through the sharing transistors 211, 212, and 213 that are in an on state so that a charge is shared from the capacitor C3 to the bootstrap capacitor C1 and the capacitor C2 and the bootstrap capacitor C1 and the capacitor C2 are charged. The charge sharing operation may be performed during the interval T14 in the waveform diagram of FIG. 10.

After a particular (e.g., a predetermined) on-period elapses from a time point when the step S25 or S26 is performed, the sharing transistors 212 and 213 may be turned off (S27). The switching control circuit 400 may generate a signal for controlling the predetermined on-period, and may control the on-duty of the sharing control signal CS2 or CS3 according to the signal. Alternatively, when a current flowing through the sharing transistors 212 and 213 is equal to or greater than a predetermined threshold value, the switching control circuit 400 may generate the sharing control signals CS2 and CS3 at an off level.

Subsequently, the power switch 14 may be turned off (S28). The power switch 13 may be turned on after a dead time elapses from a time point when the power switch 14 is turned off (S29).

After the power switch 13 is turned on, the charging transistor 123 and the charging transistor 202 may be turned on by the on-level bootstrap signal BS2 (S30). After a predetermined on-period elapses, the charging transistor 123 and the charging transistor 202 may be turned off by the off-level bootstrap signal BS2 (S31).

The steps S21 to S31 may be repeated while the converter 1 operates in the buck mode.

Figure 12:
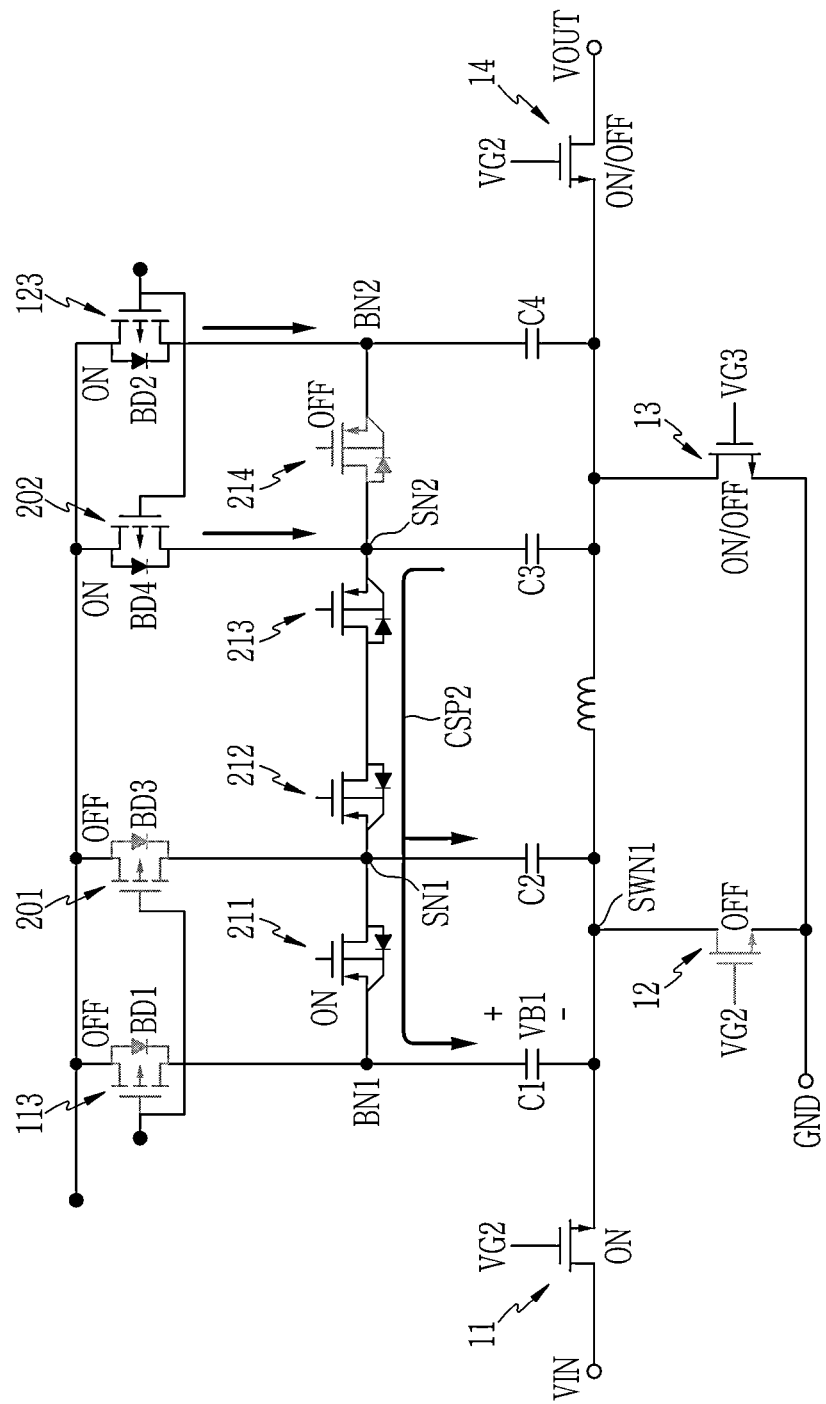
FIG. 12 is a circuit diagram illustrating an operation of the charge sharing circuit in the boost mode according to some example embodiments.

FIG. 12 is a circuit diagram illustrating an operation of the charge sharing circuit in the boost mode according to some example embodiments.

In FIG. 12, in the boost mode, the power switch 12, the sharing transistor 214, the charging transistor 113, and the charging transistor 201 controlled to be in an off state are indicated as "OFF", the power switch 11 controlled to be an on state is indicated as "ON", and the power switches 13 and 14 performing switching operations are indicated as "ON/OFF". In addition, the sharing transistors 211 to 213 forming a charge sharing path CSP2 are indicated as "ON", and the charging transistors 123 and 202 providing a path for charging the bootstrap capacitor C4 and the capacitor C3 are indicated as "ON".

As shown in FIG. 12, the charge sharing path CSP2 may be formed according to the sharing transistors 211 to 213 that are in an on state in the step S26. When the output voltage VOUT is transferred to the switching node SWN2 through the power switch 14 in an on state, a voltage of the node SN2 may be bootstrapped so that the voltage of the node SN2 becomes higher than voltages of the nodes SN1 and BN1. Then, a charge charged in the capacitor C3 along the charge sharing path CSP2 may be transferred to the capacitor C2 and the bootstrap capacitor C1 so that the voltages of the nodes SN1 and BN1 rise. As described above, charge sharing may be performed through the charge sharing path CSP2 under a condition that the bootstrap voltage VB1 is less than the threshold voltage. The bootstrap voltage VB1 may be a level capable of turning on the power switch 11 by charging of the bootstrap capacitor C1, and the bootstrap voltage VB1 may be provided to the gate driver 310 as a gate-on voltage.

The capacitor C3 and the bootstrap capacitor C4 may be charged by the power supply voltage HVDD through the charging transistor 123 and the charging transistor 202 that are in an on state in the step S30. Since the power switch 13 is in an on state in the step S30, the bootstrap capacitor C4 and the capacitor C3 may be electrically connected between the power supply voltage HVDD and the ground GND.

Figure 13:
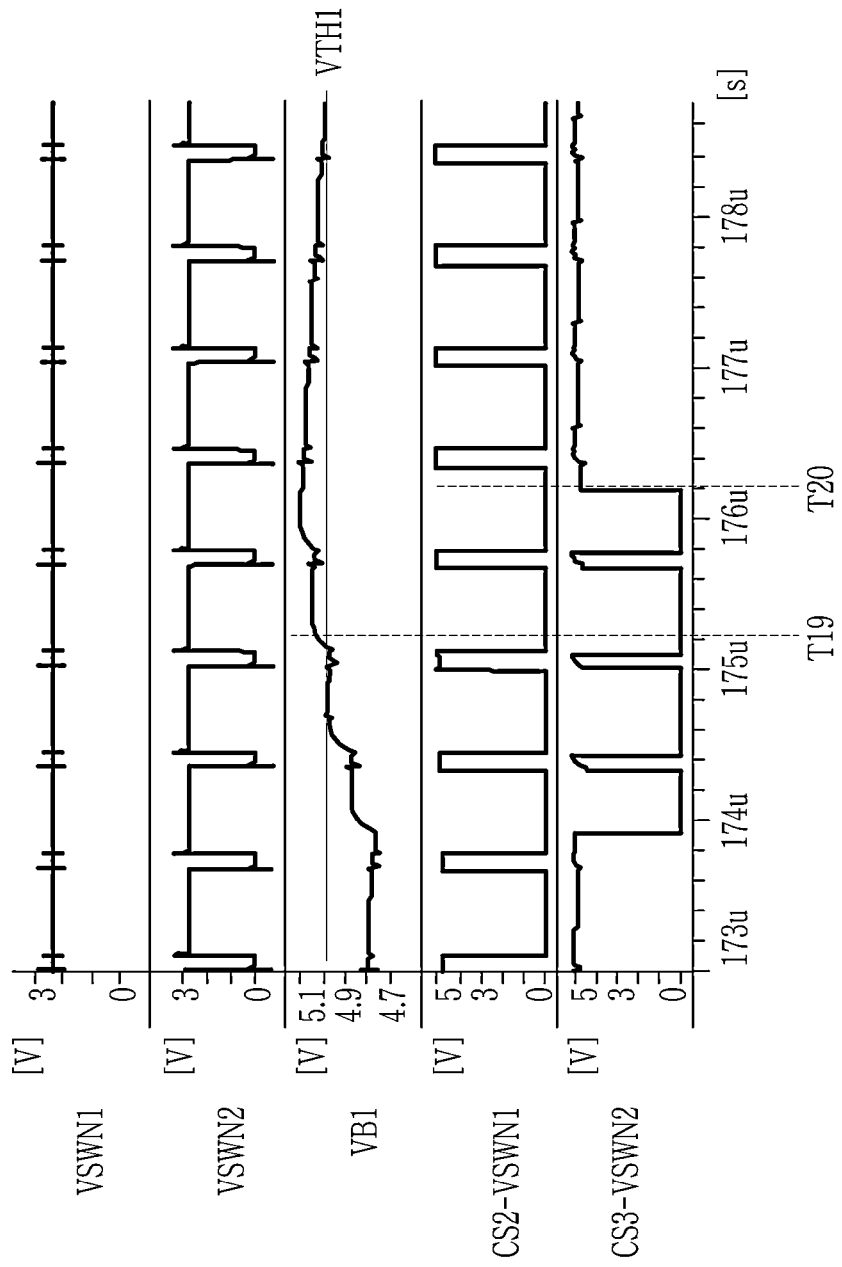
FIG. 13 is a waveform diagram illustrating an operation of controlling charge sharing in the boost mode according to some example embodiments.

FIG. 13 is a waveform diagram illustrating an operation of controlling charge sharing in the boost mode according to some example embodiments.

The waveform diagram of FIG. 13 may be a waveform diagram based on a simulation result.

In the waveform diagram of FIG. 13, the voltage VSWN1 of the switching node SWN1, the voltage VSWN2 of the switching node SWN2, the bootstrap voltage VB1, a voltage of the sharing control signal CS2 for the switching node SWN1, and a voltage of the sharing control signal CS3 for the switching node SWN2 are shown.

In the boost mode, the bootstrap capacitor C1 and the capacitor C2 may be charged through the charge sharing path CSP2 shown in FIG. 12. The bootstrap voltage VB1 may rise due to charging, and then may reach the threshold voltage VTH1 at a time point T19. Then, the voltage VBD1 may become a higher voltage than the reference voltage VR1, and the comparator 156 may generate the high-level charging signal CH1. The switching control circuit 400 may provide the sharing control signal CS3 for the sharing transistor 213 at an off level at a time point T20 in synchronization with the high-level charging signal CH1. Then, the sharing transistor 213 may be turned off to block the charge sharing path from the capacitor C3.

Hereinafter, an operation of the converter in the buck-boost mode will be described with reference to FIGS. 14 to 17.

Figure 14:
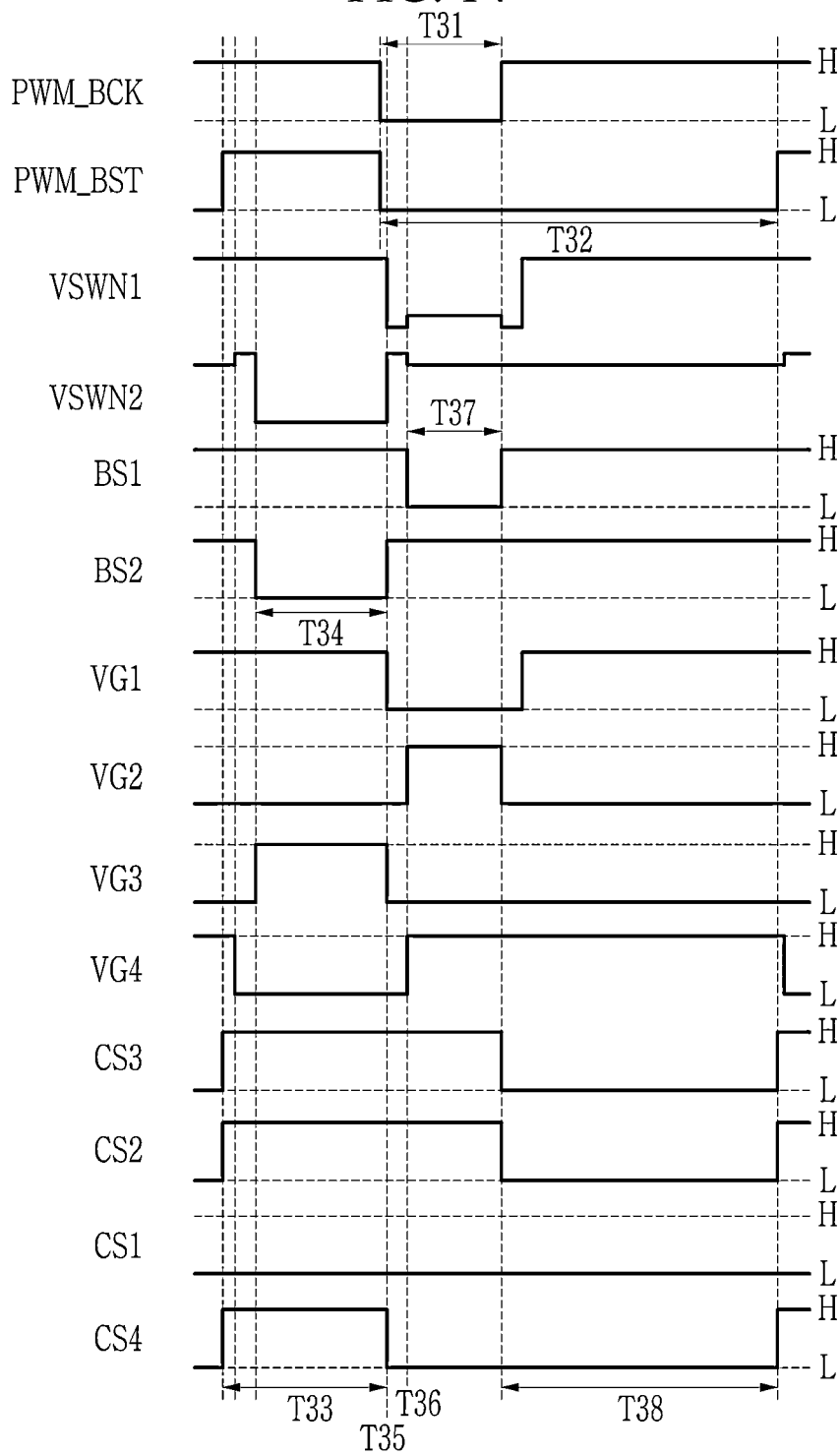
FIG. 14 is a waveform diagram of a plurality of signals for describing an operation of the converter in a buck-boost mode.

FIG. 14 is a waveform diagram of a plurality of signals for describing an operation of the converter in the buck-boost mode.

FIG. 14 is the waveform diagram showing the plurality of signals under a condition that the charging signal CH1 and the charging signal CH2 are at a low level (for example, under a condition that the bootstrap voltages VB1 and VB2 are less than a threshold such as predetermined threshold voltage). FIG. 14 shows waveforms of the plurality of signals for a predetermined interval (for example, an interval including at least one switching period of the power switches 11 to 14). Waveforms of the plurality of signals shown in FIG. 14 may be periodically repeated. As shown in FIG. 14, in the buck-boost mode, the buck control signal PWM_BCK may have an on-duty during an interval T31 and the boost control signal PWM_BST may have an off-duty during an interval T32.

In the buck-boost mode, charge sharing for the capacitor C3 and the bootstrap capacitor C4 may be provided by the capacitor C2, and charge sharing for the bootstrap capacitor C1 and the capacitor C2 may be provided by the capacitor C3. FIG. 14 shows that the sharing control signal CS4 is at an off level H during an interval T33 and the sharing control signal CS1 is at an on level. However, the waveform shown in FIG. 14 is an example for explaining embodiments, but example embodiments are not limited thereto. The sharing control signal CS4 may change according to the boost control signal PWM_BST, and the sharing control signal CS1 may be at an off level H in a portion of an interval in which the sharing control signal CS2 or CS3 is at an off level H.

In an interval T34, the bootstrap signal BS2 may be at an on level L and the charging transistor 123 and the charging transistor 202 may be in an on state, and the capacitor C3 and the bootstrap capacitor C4 may be charged by the power supply voltage HVDD. Since the gate signal VG3 is at an on level H in the interval T34, the power switch (or the power transistor) 13 may be in an on state and the switching node SWN2 may be connected to the ground GND. Since the gate signal VG1 is at a on level H in the interval T34, the power switch (or a power transistor) 11 may be in an on state and the switching node SWN1 may be at a level of the input voltage VIN.

At a time point T35, the gate signal VG3 may become an off level L so that the power switch 13 is turned off, and at a time point T36 when a dead time elapses from the time point T35, the gate signal VG4 may become an on level H so that the power switch (or a power transistor) 14 is turned on. Then, the voltage VSWN2 of the switching node SWN2 may rise to the output voltage VOUT in synchronization with the time point T36.

At the time point T35, the gate signal VG1 may become an off level L so that the power switch 11 is turned off, and at the time point T36, the gate signal VG2 may become an on level H so that the power switch 12 is turned on.

In an interval T37, the bootstrap signal BS1 may be at an on level L and the charging transistor 113 and the charging transistor 201 may be in an on state, and the bootstrap capacitor C1 and the capacitor C2 may be charged by the power supply voltage HVDD. Since the gate signal VG2 is at an on level H in the interval T37, the power switch (or a power transistor) 12 may be in an on state and the switching node SWN1 may be connected to the ground GND. Since the gate signal VG4 is at an on level H in the interval T37, the power switch 14 may be in an on state and the switching node SWN2 may be at a level of the output voltage VOUT.

All of the four sharing control signals CS1 to CS4 are at an on level L during an interval T38 so that all of the four sharing transistors 211 to 214 are in an on state. Then, a charge sharing path from the capacitor C2 to the capacitor C3 and the bootstrap capacitor C4 and a charge sharing path from the capacitor C3 to the capacitor C2 and the bootstrap capacitor C1 may be formed so that a charge is shared. The bootstrap capacitor C1 and the bootstrap capacitor C4 may be charged through charge sharing during the interval T38 so that the bootstrap voltage VB1 is controlled equal to or greater than the threshold voltage VTH1 and the bootstrap voltage VB2 is controlled equal to or greater than the threshold voltage VTH2. The gate driver 310 may provide the on-level gate signal VG1 to the power switch 11 using the bootstrap voltage VB1 equal to or greater than the threshold voltage VTH1, and the gate driver 340 may provide the on-level gate signal VG4 to the power switch 14 using the bootstrap voltage VB2 equal to or higher than the threshold voltage VTH2.

Figure 15:
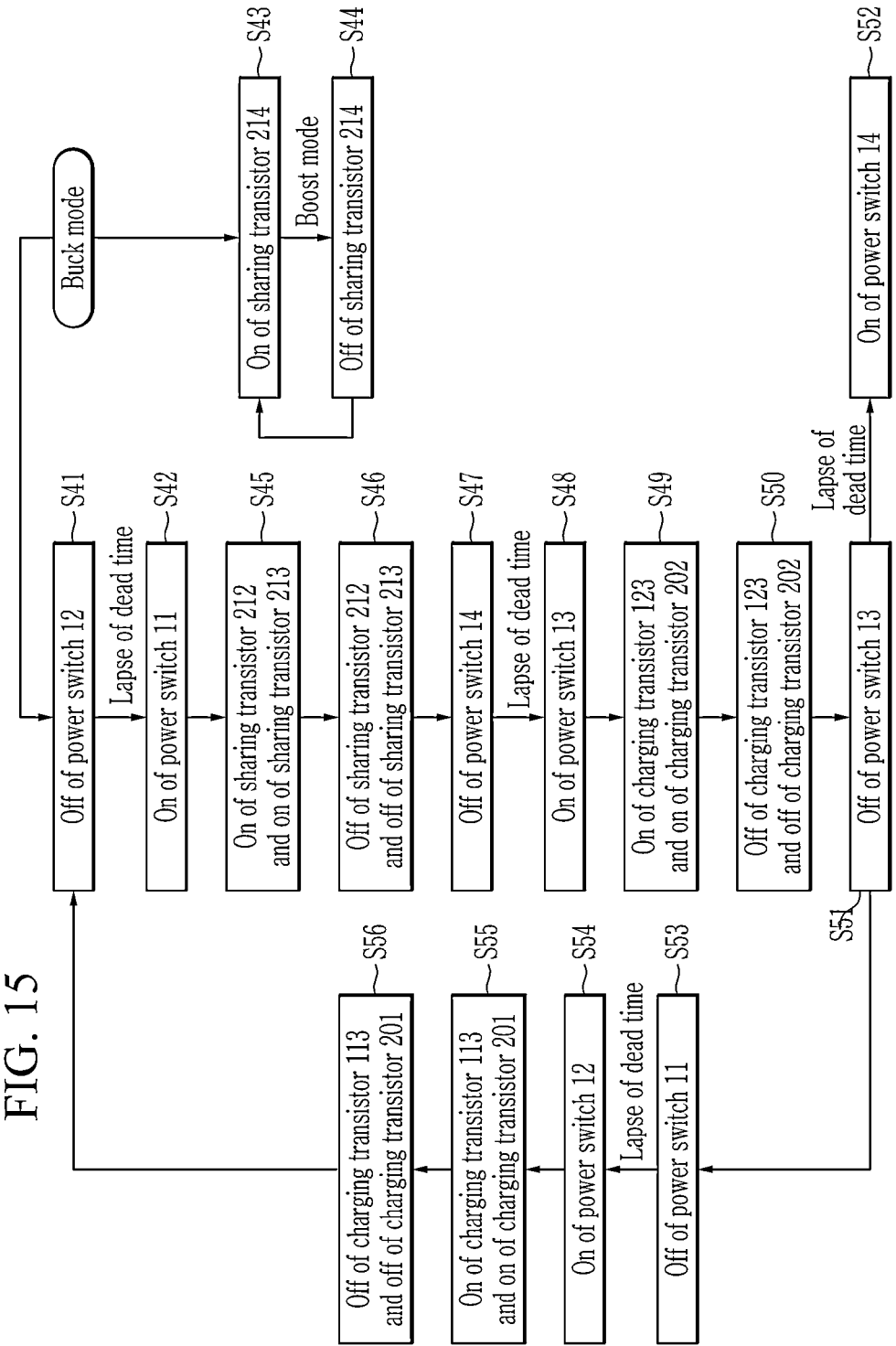
FIG. 15 is a flowchart illustrating an operation of the converter in the buck-boost mode according to some example embodiments.

FIG. 15 is a flowchart illustrating an operation of the converter in the buck-boost mode according to some example embodiments.

Each step shown in FIG. 15 may be performed under a control of the switching control circuit 400. FIG. 15 is a flowchart showing steps performed under a condition that the bootstrap voltage VB1 is less than the threshold voltage VTH1 and the bootstrap voltage VB2 is less than the threshold voltage VTH2. The sharing transistor 211 may be in an on state in a plurality of steps shown in FIG. 15.

Under a condition that the converter 1 operates in the buck-boost mode, the power switch 12 may be turned off (S41). The power switch 11 may be turned on after a dead time elapses from a time point when the power switch 12 is turned off (S42).

In the buck-boost mode, the sharing transistor 214 may be turned on (S43), and the sharing transistor 214 may be maintained in an on state for a predetermined period and then may be turned off (S44). For example, the sharing transistor 214 may be in an on state during an off-duty period of the boost control signal PWM_BST during the buck-boost mode. The steps S43 and S44 may be repeated according to the boost control signal PWM_BST. For example, the step S43 may be performed in synchronization with a falling edge (a change from an on-duty to an off-duty) of the boost control signal PWM_BST, and the step S44 may be performed in synchronization with a rising edge (the change from the off-duty to the on-duty) of the boost control signal PWM_BST.

The sharing transistor 212 and the sharing transistor 213 may be turned on after a time point at which the power switch 11 is turned on (S45). In the step S45, the sharing transistor 214 is in an on state. Then, a charge sharing path may be formed through the four sharing transistors 211, 212, 213, and 214 that are in the on state. Thus, a charge may be shared from the capacitor C3 to the bootstrap capacitor C1 and the capacitor C2 so that the bootstrap capacitor C1 and the capacitor C2 are charged, or a charge may be shared from the capacitor C2 to the bootstrap capacitor C4 and the capacitor C3 so that the bootstrap capacitor C4 and the capacitor C3 are charged. The charge sharing operation according to the step S45 may be performed during the interval T38 in the waveform diagram of FIG. 14.

After an on-period elapses from a time point at which the step S45 is performed, the sharing transistors 212 and 213 may be turned off (step S46).

Subsequently, the power switch 14 may be turned off (S47). The power switch 13 may be turned on after a dead time elapses from a time point when the power switch 14 is turned off (S48). The charging transistor 123 and the charging transistor 202 may be turned on by the on-level bootstrap signal BS2 generated in synchronization with the on time point of the power switch 13 (S49). After a predetermined on-period elapses, the charging transistor 123 and the charging transistor 202 may be turned off by the off-level bootstrap signal BS2 (S50). The power switch 13 may be turned off at a time point at which the charging transistor 123 and the charging transistor 202 are turned off (S51). The power switch 14 may be turned on after a dead time elapses from a time point when the power switch 13 is turned off (S52).

After the power switch 13 is turned off, the power switch 11 may be turned off (S53). The power switch 12 may be turned on after a dead time elapses from a time point when the power switch 11 is turned off (S54). The charging transistor 113 and the charging transistor 201 may be turned on at a time point when the power switch 12 is turned on (S55). The charging transistor 113 and the charging transistor 201 may be turned off after a predetermined on-period (S56).

The steps S41 to S56 may be repeated while the converter 1 operates in the buck-boost mode.

Figure 16:
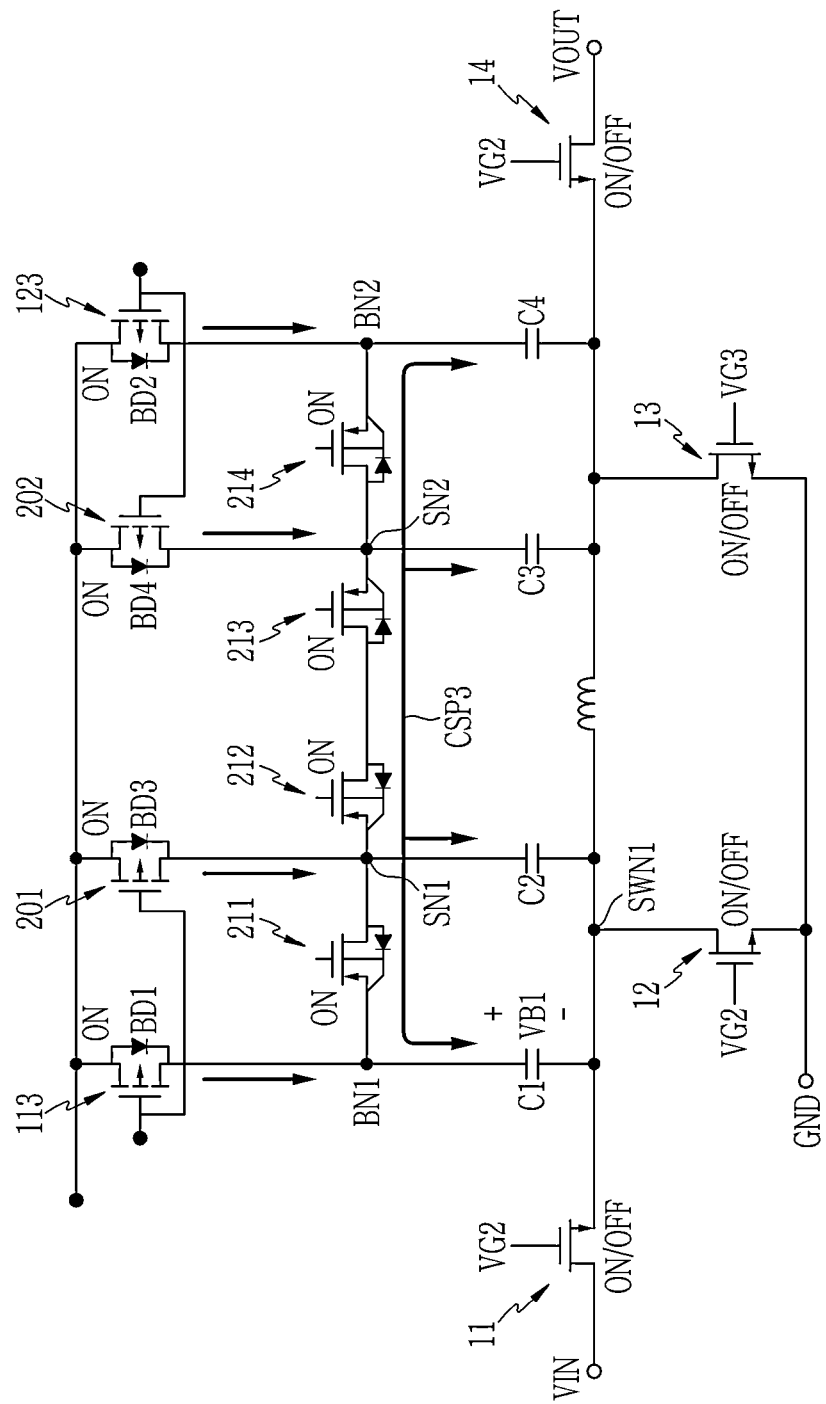
FIG. 16 is a circuit diagram illustrating an operation of the charge sharing circuit in the buck-boost mode according to some example embodiments.

FIG. 16 is a circuit diagram illustrating an operation of the charge sharing circuit in the buck-boost mode according to some example embodiments.

In FIG. 16, the power switches 11 to 14 that perform a switching operation in the buck-boost mode are indicated as "ON/OFF", the sharing transistors 211-214 forming a charge sharing path CSP3 are indicated as "ON", and the charging transistors 113, 123, 201, and 202 providing a path that charges the bootstrap capacitor C1, the capacitor C2, the capacitor C3, and the bootstrap capacitor C4 are indicated as "ON".

As shown in FIG. 16, the charge sharing path CSP3 may be formed according to the sharing transistors 211 to 214 that are in an on state in the step S45. When the input voltage VIN is transferred to the switching node SWN1 and the output voltage VOUT is transferred to the switching node SWN2 through the power switch 11 and the power switch 14 that are in an on state, the voltage of the node SN1 and the voltage of the node SN2 may be bootstrapped so that the voltage of the node SN1 and the voltage of the node SN2 rise. When the voltage of the node SN1 is higher than the voltages of the nodes SN2 and BN2, a charge stored in the capacitor C2 through the charge sharing path CSP3 may be transferred to the capacitor C3 and the bootstrap capacitor C4 so that the voltages of the nodes SN2 and BN2 rise. When the voltage of the node SN2 is higher than the voltages of the nodes SN1 and BN1, a charge stored in the capacitor C3 through the charge sharing path CSP3 may be transferred to the capacitor C2 and the bootstrap capacitor C1 so that the voltages of the nodes SN1 and BN1 rise. As described above, charge sharing may be performed through the charge sharing path CSP3 when the bootstrap voltage VB1 and the bootstrap voltage VB2 are less than the threshold voltages VTH1 and VTH2, so that the bootstrap voltage VB1 and the bootstrap voltage VB2 are controlled equal to or greater than the threshold voltages VTH1 and VTH2. The bootstrap voltage VB1 may be a level capable of turning on the power switch 11 by charging of the bootstrap capacitor C1, and the bootstrap voltage VB1 may be provided to the gate driver 310 as a gate-on voltage. The bootstrap voltage VB2 may be a level capable of turning on the power switch 14 by charging of the bootstrap capacitor C4, and the bootstrap voltage VB2 may be provided to the gate driver 340 as a gate-on voltage.

The capacitor C3 and the bootstrap capacitor C4 may be charged by the power supply voltage HVDD through the charging transistor 123 and the charging transistor 202 that are in an on state in the step S49. Since the power switch 13 is in an on state in the step S49, the capacitors C3 and C4 may be electrically connected between the power supply voltage HVDD and the ground GND.

The bootstrap capacitor C1 and the capacitor C2 may be charged by the power supply voltage HVDD through the charging transistor 113 and the charging transistor 201 that are in an on state in the step S55. Since the power switch 12 is in an on state in the step S55, the capacitors C1 and C2 may be electrically connected between the power supply voltage HVDD and the ground GND.

Since a charge sharing path from the capacitor C2 to the capacitor C3 and the bootstrap capacitor C4 is provided in the buck mode, a charge sharing path from the capacitor C3 to the capacitor C2 and the bootstrap capacitor C3 is provided in the boost mode, and a charge sharing path in both directions is provided in the buck-boost mode, charging through the charge sharing path together with charging by the power supply voltage HVDD may be provided to the bootstrap capacitor C1 and the bootstrap capacitor C4. Then, a charging time for the bootstrap capacitor C1 and a charging time for the bootstrap capacitor C4 may be shortened compared with a conventional art. For example, a time for charging the bootstrap capacitor may be reduced compared with the conventional art, so that limitations on minimum toggle times of the switching node SWN1 and SWN2 in each of the buck mode, the boost mode, and the buck-boost mode are improved. Then, the minimum toggle times of the switching node SWN1 and SWN2 may be longer as compared with a conventional approach, so that a ripple of the output voltage VOUT is reduced. Alternatively or additionally, even when the mode is changed, the minimum toggle times of the switching node SWN1 and SWN2 may be longer compared with the conventional approach so that the ripple of the output voltage VOUT is reduced.

Figure 17:
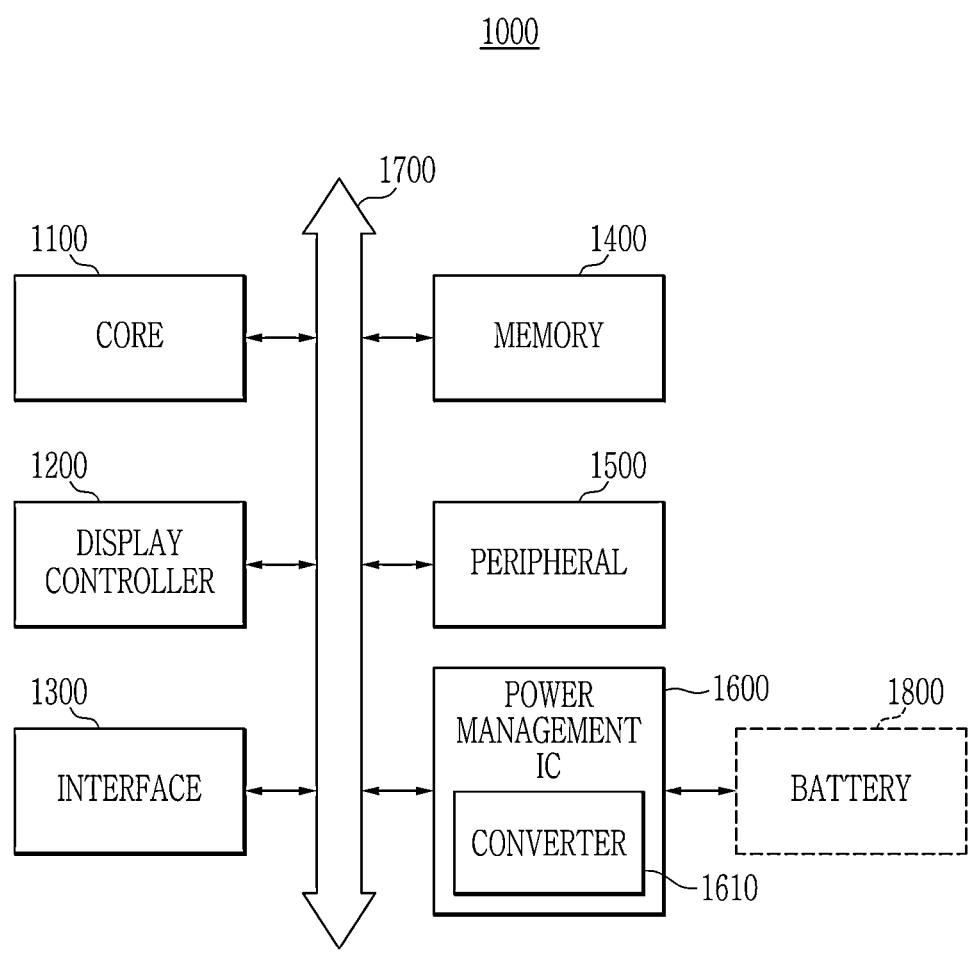
FIG. 17 is a block diagram illustrating a system including the converter according to some example embodiments.

FIG. 17 is a block diagram illustrating a system including the converter according to some example embodiments.

The system 1000 shown in FIG. 17 may include at least one of a core processor (CORE) 1100, a display controller (DISPLAY CONTROLLER) 1200, an interface device (INTERFACE) 1300, a memory device (MEMORY) 1400, and a peripheral device (PERIPHERAL) 1500, and may further include a power management device (POWER MANAGEMENT IC) 1600 and a battery 1800.

The core processor 1100, the display controller 1200, the interface device 1300, the memory device 1400, the peripheral device 1500, and the power management device 1600 may be connected to each other through a system bus 1700. The system bus 1700 may be a path through which data is moved.

The core processor 1100 may include one processor (single-core) or a plurality of processors (multi-core) to process data. For example, the core processor 1100 may include a multi-core processor such as a dual-core processor, a quad-core processor, a hexa-core processor, or the like. Although not clearly shown in FIG. 17, the core processor 1100 may further include a cache memory disposed inside or outside the core processor 1100.

The display controller 1200 may control a display device so that the display device displays an image.

The interface device 1300 may perform a function of transmitting data to a communication network or receiving data from the communication network. The interface device 1300 may include an antenna, a wired/wireless transceiver, or the like.

The memory device 1400 may be configured to store commands and/or data. For example, the memory device 1400 may include a volatile memory device such as a static random access memory (SRAM) and/or a dynamic random access memory (DRAM), and/or a non-volatile memory device such as one or more of a read only memory (ROM), an electrically erasable and programmable ROM (EEPROM), or a flash memory, but example embodiments are not limited thereto.

The peripheral device 1500 may include one or more devices such as one or more of a serial communication device, a memory management device, an audio processing device, or the like.

The power management device 1600 may supply electric power to the core processor 1100, the display controller 1200, the interface device 1300, the memory device 1400, and the peripheral device 1500. The power management device 1600 may be connected to the battery 1800 to receive a power supply voltage from the battery 1800.

The power management device 1600 may include the converter 1610 according to the embodiment. The converter 1610 may be implemented as the converter according to the above-described embodiment.

The system 1000 may be provided as a component (e.g., a system on chip (SOC)) of any portable system such as a smart phone, a tablet, or the like.

The system 1000 may also be applied to other electronic devices not illustrated herein. For example, the system 100 may be provided as one or more than one of various components of an electronic device such as a personal computer, an ultra-mobile PC (UMPC), a workstation, a net-book, a personal digital assistant (PDA), a portable computer, a web tablet, a wireless phone, a mobile phone, an e-book, a portable multimedia player (PMP), a portable game console, a navigation device, a black box, a digital camera, a 3-dimensional television, a digital audio recorder, a digital audio player, a digital picture recorder, a digital picture player, a digital video recorder, a digital video player, a device capable of transmitting and receiving information in a wireless environment, one of various electronic devices constituting a home network, one of various electronic devices constituting a computer network, one of various electronic devices constituting a telematics network, an RFID device, one of various components constituting a computing system, or the like.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various features have been described in connection with what is presently considered to be practical embodiments, it is to be understood that the disclosure is not limited to variously described example embodiments, but, on the contrary, is intended to cover various modifications and equivalent arrangements included within the spirit and scope of the appended claims. Furthermore, example embodiments are not necessarily mutually exclusive with one another. For example, some example embodiments may include one or more features described with reference to one or more figures, and may also include one or more other features described with reference to one or more other figures.

What is claimed is:

1. A power supply comprising:
an inductor connected between a first switching node and a second switching node;
a first power switch, a second power switch, and a first bootstrap capacitor, the first bootstrap capacitor including one end connected to the first switching node;
a third power switch, a fourth power switch, and a second bootstrap capacitor, the second bootstrap capacitor including one end connected to the second switching node; and
a charge sharing circuit configured to store a charge using a power supply voltage, to provide a first charge sharing path for the first bootstrap capacitor from the stored charge based on a first voltage charged in the first bootstrap capacitor, and to provide a second charge sharing path for the second bootstrap capacitor from the stored charge based on a second voltage charged in the second bootstrap capacitor,
wherein the first charge sharing path and the second charge sharing path include a common charge sharing path and overlap each other.

2. The power supply of claim 1, wherein
in a buck mode where an input voltage of the power supply is higher than a target voltage of the power supply, the first switching node is configured to toggle according to switching operations of the first power switch and the second power switch, and the power supply is configured to have an output voltage output through the fourth power switch, and
the charge sharing circuit is configured to provide the second charge sharing path in response to a level of the second voltage being lower than a threshold voltage.

3. The power supply of claim 1, wherein
in a boost mode where an input voltage of the power supply is lower than a target voltage of the power supply, the second switching node is configured to toggle according to switching operations of the third power switch and the fourth power switch and the power supply is configured to have the input voltage input through the first power switch, and
the charge sharing circuit provides the first charge sharing path when a level of the first voltage is lower than a threshold voltage.

4. The power supply of claim 1, wherein
in a buck-boost mode in which the power supply operates alternately in a buck mode and a boost mode, the first switching node is configured to toggle according to switching operations of the first power switch and the second power switch and the power supply is configured to have an output voltage output through the fourth power switch, or
in the buck-boost mode, the second switching node is configured to toggle according to switching operations of the third power switch and the fourth power switch and the power supply is configured to have an input voltage input through the first power switch, and
the charge sharing circuit is configured to provide the first charge sharing path in response to the first voltage being lower than a first threshold voltage or the charge sharing circuit is configured to provide the second charge sharing path when the second voltage is lower than a second threshold voltage.

5. The power supply of claim 1, further comprising:
a first switch connected between another end of the first bootstrap capacitor and a first voltage source; and
a second switch connected between another end of the second bootstrap capacitor and the first voltage source,
wherein the first bootstrap capacitor is configured to supply a first gate-on voltage of the first power switch, and the second bootstrap capacitor is configured to supply a second gate-on voltage of the fourth power switch.

6. The power supply of claim 5, wherein the charge sharing circuit comprises:
a first capacitor including one end connected to the first switching node;
a second capacitor including one end connected to the second switching node;
a first sharing transistor connected between the other end of the first bootstrap capacitor and another end of the first capacitor;
a second sharing transistor connected between the other end of the second bootstrap capacitor and another end of the second capacitor; and
a third sharing transistor and a fourth sharing transistor that are connected in series between the other end of the first capacitor and the other end of the second capacitor.

7. The power supply of claim 6, wherein
in a buck mode in which the first power switch and the second power switch perform switching operations, the second sharing transistor is configured to be in an on state and the first sharing transistor is configured to be in an off state, and
under a condition that the second voltage is lower than a threshold voltage, the second charge sharing path is provided by turning on the third sharing transistor and the fourth sharing transistor.

8. The power supply of claim 6, wherein
in a boost mode in which the third power switch and the fourth power switch perform switching operations, the first sharing transistor is configured to be in an on state and the second sharing transistor is configured to be in an off state, and
under a condition that the first voltage is lower than a threshold voltage, the first charge sharing path is configured to be provided by turning on the third sharing transistor and the fourth sharing transistor.

9. The power supply of claim 6, wherein
in a buck-boost mode in which the first power switch, the second power switch, the third power switch, and the fourth power switch are configured to perform switching operations,
in response to the first sharing transistor and the second sharing transistor being in an on state, the first charge sharing path is configured to be provided by turning on the third sharing transistor and the fourth sharing transistor under a condition that the first voltage is lower than a first threshold voltage, or
in response to the first sharing transistor and the second sharing transistor being in an on state, the second charge sharing path is configured to be provided by turning on the third sharing transistor and the fourth sharing transistor under a condition that the second voltage is lower than a second threshold voltage.

10. The power supply of claim 6, wherein
a first capacitance ratio between the first bootstrap capacitor and the first capacitor is at least 3:1, and
a second capacitance ratio between the second bootstrap capacitor and the second capacitor is at least 3:1.

11. The power supply of claim 6, wherein
in response to the voltage of the first capacitor being greater than or equal to a first reference voltage or the voltage of the second capacitor being greater than or equal to a second reference voltage, at least one of the third sharing transistor and the fourth sharing transistor is configured to be turned off.

12. A power supply comprising:
a first power switch including one end configured to have an input voltage to be provided;
an inductor including one end connected to another end of the first power switch at a first switching node;
a second power switch including one end connected to another end of the inductor at a second switching node;
a first capacitor connected between the first switching node and a first node;
a second capacitor connected between the second switching node and a second node;
a first sharing transistor and a second sharing transistor connected in series between the first node and the second node;
a third sharing transistor connected in series with the first sharing transistor; and
a fourth sharing transistor connected in series with the second sharing transistor.

13. The power supply of claim 12, further comprising:
a first bootstrap capacitor connected between the first switching node and a third node, the third sharing transistor between the third node and the first node; and
a second bootstrap capacitor connected between the second switching node and a fourth node, the fourth sharing transistor between the fourth node and the second node.

14. The power supply of claim 13, further comprising:
a first charging transistor including one end to which a power supply voltage is configured to be supplied and another end connected to the first node;
a second charging transistor including one end to which the power supply voltage is configured to be supplied and another end connected to the second node;
a third charging transistor including one end to which the power supply voltage is configured to be supplied and another end connected to the third node; and
a fourth charging transistor including one end to which the power supply voltage is configured to be supplied and another end connected to the fourth node.

15. The power supply of claim 13, further comprising:
a first gate driver connected to the third node and configured to receive a first gate-on voltage of the first power switch from the first bootstrap capacitor; and
a second gate driver connected to the fourth node and configured to receive a second gate-on voltage of the second power switch from the second bootstrap capacitor.

16. The power supply of claim 13, further comprising:
a first charge limiter configured to compare a voltage of the first bootstrap capacitor with a first reference voltage, and configured to provide a first comparison result;

a second charge limiter configured to compare a voltage of the second bootstrap capacitor with a second reference voltage, and to provide a second comparison result; and
a switching control circuit configured to turn off at least one of the first sharing transistor and the second sharing transistor in response to the first comparison result indicating that the voltage of the first bootstrap capacitor is greater than or equal to the first reference voltage or in response to the second comparison result indicating that the voltage of the second bootstrap capacitor is greater than or equal to the second reference voltage.

17. A driving method of a power supply including a first power switch connected between an input terminal and a first switching node and a second power switch connected between an output terminal and a second switching node, comprising:
in a buck mode of the power supply, sharing a charge from a first capacitor connected to the first switching node to a first bootstrap capacitor connected to the second switching node through a first charge sharing path;
in a boost mode of the power supply, sharing a charge from a second capacitor connected to the second switching node to a second bootstrap capacitor connected to the first switching node through a second charge sharing path; and
in a buck-boost mode of the power supply, sharing a charge from the first capacitor to the first bootstrap capacitor or sharing a charge from the second capacitor to the second bootstrap capacitor through a third charge sharing path.

18. The driving method of claim 17, wherein the sharing of the charge in the buck mode of the power supply comprises:
turning on a first sharing transistor and a second sharing transistor that are connected in series between one end of the first capacitor and one end of the second capacitor; and
turning on a third sharing transistor connected between one end of the first bootstrap capacitor and the one end of the second capacitor,
wherein another end of the first capacitor is connected to the first switching node, and another end of the second capacitor and another end of the first bootstrap capacitor are connected to the second switching node.

19. The driving method of claim 17, wherein the sharing of the charge in the boost mode of the power supply comprises:
turning on a first sharing transistor and a second sharing transistor connected in series between one end of the first capacitor and one end of the second capacitor; and
turning on a third sharing transistor connected between one end of the second bootstrap capacitor and the one end of the first capacitor,
wherein another end of the first capacitor and another end of the second bootstrap capacitor are connected to the first switching node, and another end of the second capacitor is connected to the second switching node.

20. The driving method of claim 17, wherein the sharing of the charge in the buck-boost mode of the power supply comprises:
turning on a first sharing transistor and a second sharing transistor connected in series between one end of the first capacitor and one end of the second capacitor;
turning on a third sharing transistor connected between one end of the first capacitor and one end of the second bootstrap capacitor; and turning on a fourth sharing transistor connected between one end of the second capacitor and one end of the first bootstrap capacitor, wherein another end of the first capacitor and another end of the second bootstrap capacitor are connected to the first switching node, and another end of the second capacitor and another end of the first bootstrap capacitor are connected to the second switching node.

\* \* \* \* \*